(12) United States Patent
Nishi et al.

(10) Patent No.: US 10,747,043 B2
(45) Date of Patent: Aug. 18, 2020

(54) PROJECTOR

(71) Applicant: SEIKO EPSON CORPORATION, Tokyo (JP)

(72) Inventors: Toshizo Nishi, Azumino (JP); Tomoaki Miyashita, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 65 days.

(21) Appl. No.: 16/172,984

(22) Filed: Oct. 29, 2018

(65) Prior Publication Data

US 2019/0129237 A1 May 2, 2019

(30) Foreign Application Priority Data

Oct. 30, 2017 (JP) ................................. 2017-209577

(51) Int. Cl.
*G02F 1/1333* (2006.01)
*G03B 21/00* (2006.01)
*G02F 1/13363* (2006.01)
*G02F 1/1335* (2006.01)

(52) U.S. Cl.
CPC .... *G02F 1/133385* (2013.01); *G02F 1/13363* (2013.01); *G02F 1/133308* (2013.01); *G03B 21/006* (2013.01); *G02F 1/133528* (2013.01); *G02F 2001/13332* (2013.01); *G02F 2001/133314* (2013.01); *G02F 2001/133548* (2013.01); *G02F 2203/12* (2013.01)

(58) Field of Classification Search
CPC ......... G02F 1/133385; G02F 1/133528; G02F 2001/133548; G02F 2203/12; G02F 2001/13332; G02F 2001/133314; G02F 1/13363; G02F 1/133308; G03B 21/006
USPC ........................................................ 349/161
See application file for complete search history.

(56) References Cited

U.S. PATENT DOCUMENTS

2008/0225188 A1* 9/2008 Hoshino ................ G03B 21/16
349/8

FOREIGN PATENT DOCUMENTS

| JP | H04-142527 A | 5/1992 |
| JP | 2002-214585 A | 7/2002 |
| JP | 2008-051997 A | 3/2008 |

* cited by examiner

*Primary Examiner* — Charles S Chang
(74) *Attorney, Agent, or Firm* — Oliff PLC

(57) ABSTRACT

Projector including a light source device, an image forming device, and a cooling device, image forming device includes a light modulation device having a liquid crystal panel, incident side polarization plate and attachment member, a liquid crystal panel includes a panel main body having a modulation area having a rectangular shape, and a frame, cooling device includes a first circulation device that makes a liquid refrigerant flow through a first flow channel included in frame along one of long sides and short sides in modulation area, the incident side polarization plate has a polarization plate main body and a light transmissive substrate, attachment member includes clamp-holding members adapted to clamp-hold the incident side polarization plate, and a support member, clamp-holding members are disposed at positions corresponding respectively to the long sides, and the support member is connected to the areas respectively along the short sides on the frame surface.

7 Claims, 15 Drawing Sheets

PROJECTOR

BACKGROUND

1. Technical Field

The present invention relates to a projector.

2. Related Art

In the past, there has been known a projector provided with a light source device, a light modulation device for modulating the light emitted from the light source device, and a projection optical device for projecting the light having been modulated by the light modulation device. As such a projector, there is known a projector having a transmissive liquid crystal panel, and polarization plates disposed respectively on the incident side and the emission side of the transmissive liquid crystal panel (see, e.g., JP-A-2002-214585 (Document 1)).

The projector described in Document 1 is provided with a sapphire substrate as a heat radiating member entirely bonded to a surface of each of the polarization plate, and a heat radiation member for radiating the heat transferred from the sapphire substrate in addition to the constituents described above. Further, the heat generated in the polarization plates is transferred to the heat radiation member via the sapphire substrates, and is then radiated by the heat radiation member. Thus, the polarization plates are cooled.

In recent years, in response to the demand for achieving high-luminance projection images, it has been promoted to realize a high-luminance light source device to be adopted in a projector. In the projector in which such a light source device is adopted, there has arisen a necessity for effectively cooling not only the polarization plate located on the emission side of the liquid crystal panel described above but also the polarization plate located on the incident side.

Therefore, there has been demanded a configuration capable of more effectively cooling the polarization plate located on the incident side of the liquid crystal panel.

SUMMARY

An advantage of some aspects of the invention is to provide a projector capable of effectively cooling the polarization plate located on the incident side or the liquid crystal panel.

A projector according to an aspect the invention includes a light source device, an image forming device adapted to form an image using light emitted from the light source device, a projection optical device adapted to project the image formed by the image forming device, and a cooling device adapted to cool the image forming device, the image forming device includes a light modulation device adapted to modulate the light emitted from the light source device, the light modulation device includes a liquid crystal panel, an incident side polarization plate located on a light incidence side of the liquid crystal panel, and an attachment member adapted to attach the incident side polarization pate to the liquid crystal panel, the cooling device includes a first circulation device adapted to make a liquid refrigerant flow through the liquid crystal panel, the liquid crystal panel includes a panel main body having a modulation area having a rectangular shape and adapted to modulate the light, and a frame surrounding the panel main body, the frame includes a first flow channel which is disposed outside the modulation area and along one of a pair of ling sides and a pair of short sides of the modulation area, and through which the liquid refrigerant flows, the incident side polarization plate includes a polarization plate main body, and a light transmissive substrate located on a light incidence side with respect to the polarization plate main body, and having contact with the polarization plate main body, the attachment member includes a pair of clamp-holding members adapted to clamp-hold the incident side polarization plate, and a support member attached to a surface on the light incidence side in the frame and adapted to support the pair of clamp-holding members, the pair of clamp-holding members are disposed at positions corresponding respectively to the pair of long sides, and the support member is connected to areas respectively along the pair of short sides outside the modulation area on the surface on the light incidence side in the frame.

According to such a configuration, a part of the heat generated in the polarization plate main body of the incident side polarization plate is transferred to the light transmissive substrate located on the light incidence side with respect to the polarization plate main body, and then radiated by the light transmissive substrate. Thus, the polarization plate main body is cooled.

Further, another part of the heat generated in the polarization plate main body is transferred to the support member from the polarization plate main body. Since the support member is connected to the surface on the light incidence side in the frame surrounding the panel main body, the heat having been transferred to the support member is transferred to the frame. The frame has a flow channel of a liquid refrigerant made to flow by the first circulation device, and the flow channel is formed outside the modulation area along one of the pair of long sides and the pair of short sides of the modulation area. Further, since the areas to which the support member is connected in the frame are positions corresponding respectively to the pair of short sides, the liquid refrigerant can be made to flow in the transmission area of the heat from the support member to the frame. Thus, the heat of the polarization plate main body having been transferred to the frame can effectively be transferred to the liquid refrigerant, and thus the polarization plate main body can be cooled.

Further, since the pair of clamp-holding members are disposed at the positions corresponding respectively to the pair of long sides of the modulation area, it is possible to make the connection parts to the frame and the clamp-held parts clamp-held by the respective clamp-holding members different from each other in the support member, and thus, it is possible to make it easy to form the gap between the frame and the polarization plate main body. Since it is possible to transfer the heat of the frame and the heat of the polarization plate main body to the gaseous refrigerant flowing through the gap, it is possible to air-cool the frame and the polarization plate main body.

Therefore, since the heat of the polarization plate main body is dissipated, and then the heat can efficiently be transferred to the liquid refrigerant a the gaseous refrigerant, it is possible to efficiently Cool the polarization plate main body, namely the polarization plate located on the light incidence side of the light modulation device.

In the aspect of the invention described above, it is preferable that the frame is disposed along the other of the pair of long sides outside the modulation area, and has a second flow channel through which a part of the liquid refrigerant flows.

According to such a configuration, since the frame has the second flow channel in addition to the first flow channel, the contact area between the heat having been transferred to the frame and the liquid refrigerant can be increased. Thus, the heat of the panel main body transferred to the frame and the heat of the polarization plate main body transferred to the frame via the support member can efficiently be transferred to the liquid refrigerant. Therefore, the panel main body and the polarization plate main body can efficiently be cooled.

In the aspect of the invention described above, it is preferable that the polarization plate main body is a wire-grid polarization element having a transmission axis, and each of the pair of clamp-holding members is disposed in accordance with a side surface crossing the transmission axis out of side surfaces of the incident side polarization plate.

It should be noted that the wire-grid polarization element has a grid structure in which a plurality of linear wires is arranged in a plane. The wire-grid polarization element transmits the light of the polarization component in a direction perpendicular to the extending direction of the wires described above while absorbing or reflecting the light of the polarization component in a direction parallel to the extending direction of the wires. In other words, the transmission axis of the wire-grid polarization element is an axis parallel to the perpendicular direction to the extending direction of the wires described above.

Here, when the clamp-holding members hold the incident side polarization plate by clamping, the wire-grid structure of the incident side polarization plate is partially broken in some cases. Further, in the case in which the clamp-holding members are disposed on the side surfaces crossing the extending direction of the wires described above in the polarization plate main body, there is a possibility that the breakage having occurred spreads lone the wires, and the damaged part is located inside the transmission area of the light in the polarization plate main body. Therefore, it is necessary to adjust the clamping force by the clamp-holding members, and consider the configuration of the clamp-holding members so as not to cause the breakage.

In contrast, the clamp-holding members are disposed on the side surfaces crossing the transmission axis described above, namely the side surfaces parallel to the extending direction of the wires. According to this configuration, even in the case in which the breakage spreads along the wires, the damage part can be prevented from being located inside the transmission area described above. Therefore, it is possible to prevent the reliability of the incident side polarization plate, and by extension, the reliability of the projector, from deteriorating.

In the aspect of the invention described above, it is preferable that the image forming device includes a plurality of the light modulation devices, and a light combining device adapted to combine the light beams modulated by the plurality of light modulation devices with each other, the plurality of the light modulation devices includes a first light modulation device adapted to modulate first light beam out of the light emitted from the light source device, a second light modulation device adapted to modulate second light beam out of the light emitted from the light source device, and a third light modulation device adapted to modulate third light beam out of the light emitted from the light source device, the light combining device transmits the first light beam modulated by the first light modulation device, and reflects the second light beam modulated by the second light modulation device, and the third light beam modulated by the third light modulation device to combine the first light beam, the second light beam, and the third light beam with each other, and the image forming device has retardation elements disposed on respective light paths of the second light beam and the third light beam entering the light combining device, and each adapted to rotate a polarization direction of the light beam entering the retardation element.

According to such a configuration, among the fist light beam, the second light beam and the third light beam combined with each other by the light combining device, the first light beam is transmitted through the light combining device, while the second light beam and the third light beam are reflected by the light combining device. Further, since the retardation elements described above are respectively disposed on the light paths of the second light beam and the third light beam, it is possible to make the second light beam and the third light beam enter the light combining device as the light beams with the polarization hard to cause the loss in the reflection by the light combining device. Further, it is possible to make the first light beam enter the light combining device as the light beam with the polarization hard to cause the loss in the transmission by the light combining device. Therefore, it is possible to prevent the loss of the first light beam, the second light beam, and the third light beam from occurring in the light combining device.

In the aspect of the invention described above, it is preferable that the retardation elements are respectively disposed on a light emission side of the second light modulation device and the third light modulation device in the respective light paths of the second light beam and the third light beam, the pair of clamp-holding members are disposed at positions corresponding respectively to the pair of long sides in each of the plurality of the light modulation devices, and the support member is connected to areas respectively along the pair of short sides outside the modulation area on the surface on the light incidence side in each of the frames of the plurality of the light modulation devices.

Here, since the retardation elements are disposed on the light emission side of the second light modulation device and the third light modulation device, respectively, it is possible to make the light with the same polarization direction enter each of the light modulation devices. Therefore, it is possible to uniform the arrangement of the support member and the clamp-holding members in each of the light modulation devices. Therefore, it is possible to simplify the configuration of the projector.

In the aspect of the invention described above, it is preferable that the retardation elements are respectively disposed on a light incidence side of the polarization plate main body provided to each of the second light modulation device and the third light modulation device in the respective light paths of the second light beam and the third light beam, the pair of clamp-holding members provided to the first light modulation device are disposed at positions corresponding respectively to the pair of long sides, the support member provided to the first light modulation device is connected to areas respectively along the pair of short sides outside the modulation area on the surface on the light incidence side in the frame of the first light modulation device, the pair of clamp-holding members provided to each of the second light modulation device and the third light modulation device are disposed at positions corresponding respectively to the pair of long sides, and the support member provided to each of the second light modulation device and the third light modulation device is connected to areas respectively along the pair of short sides outside the modulation area on the surface on the light incidence side in each of the frames of the second light modulation device and the third light modulation device.

According to such a configuration, since the retardation elements are located on the light incidence side of the polarization plate main body provided to the second and third light modulation devices, the polarization direction of the first light beam entering the polarization plate main body of the first light modulation device and the polarization direction of the second light beam and the third light beam entering the respective polarization plate main bodies of the second and third light modulation devices are different from each other. Therefore, the extending direction of the transmission axis in the polarization plate main body of the first light modulation device and the extending direction of the transmission axis in the polarization plate main body of the second and third light modulation devices are different from each other.

In contrast, according to the configuration described above, the pair of clamp-holding members provided to the first light modulation device are disposed at the positions corresponding to the pair of long sides described above, and the pair of clamp-holding members provided to each of the second and third light modulation devices are disposed at the positions corresponding to the pair of short sides described above. According to this configuration, it is possible to dispose the clamp-holding members in accordance with the side surfaces crossing the transmission axis of each of the polarization plate main bodies in all of the first through third light modulation devices. Therefore, it is possible to prevent the damaged part from being located in the transmission area of the light of the polarization plate main body constituting each of the light modulation devices, and thus, it is possible to further improve the reliability of the projector.

Further, in the first light modulation device, the support member is connected to the positions corresponding to the pair of short sides described above. Therefore, it is possible to make the liquid refrigerant flow through the connection area of the support member in the frame, namely the transmission area of the heat from the polarization plate main body similarly to the above. Therefore, it is possible to effectively transfer the heat to the liquid refrigerant.

It should be noted that in the second and third light modulation devices, the support member is connected to the areas corresponding respectively to the pair of long sides described above in the frame. Therefore, in the case in which the second flow channel is absent in the frame, it becomes difficult to transfer the heat of the polarization plate main body to the liquid refrigerant in the second and third light modulation devices, and therefore, the cooling efficiency of the polarization plate main body slightly decreases. However, the retardation element located on the light incidence side with respect to the light modulation device can be used as the light transmissive member. In this case, the number of the components can be prevented from increasing compared to the case of separately providing the retardation element.

In the aspect of the invention described above, it is preferable that the cooling device includes a second circulation device adapted to make a gaseous refrigerant flow through the incident side polarization plate and the liquid crystal panel along a direction from one of the pair of long sides toward the other of the pair of long sides.

According to this configuration, it is possible to reliably transmits the heat generated in each of the incident side polarization plate and the liquid crystal panel not only to the liquid refrigerant but also to the gaseous refrigerant. Therefore, it is possible to more effectively cool the incident side polarization plates and the liquid crystal panels.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
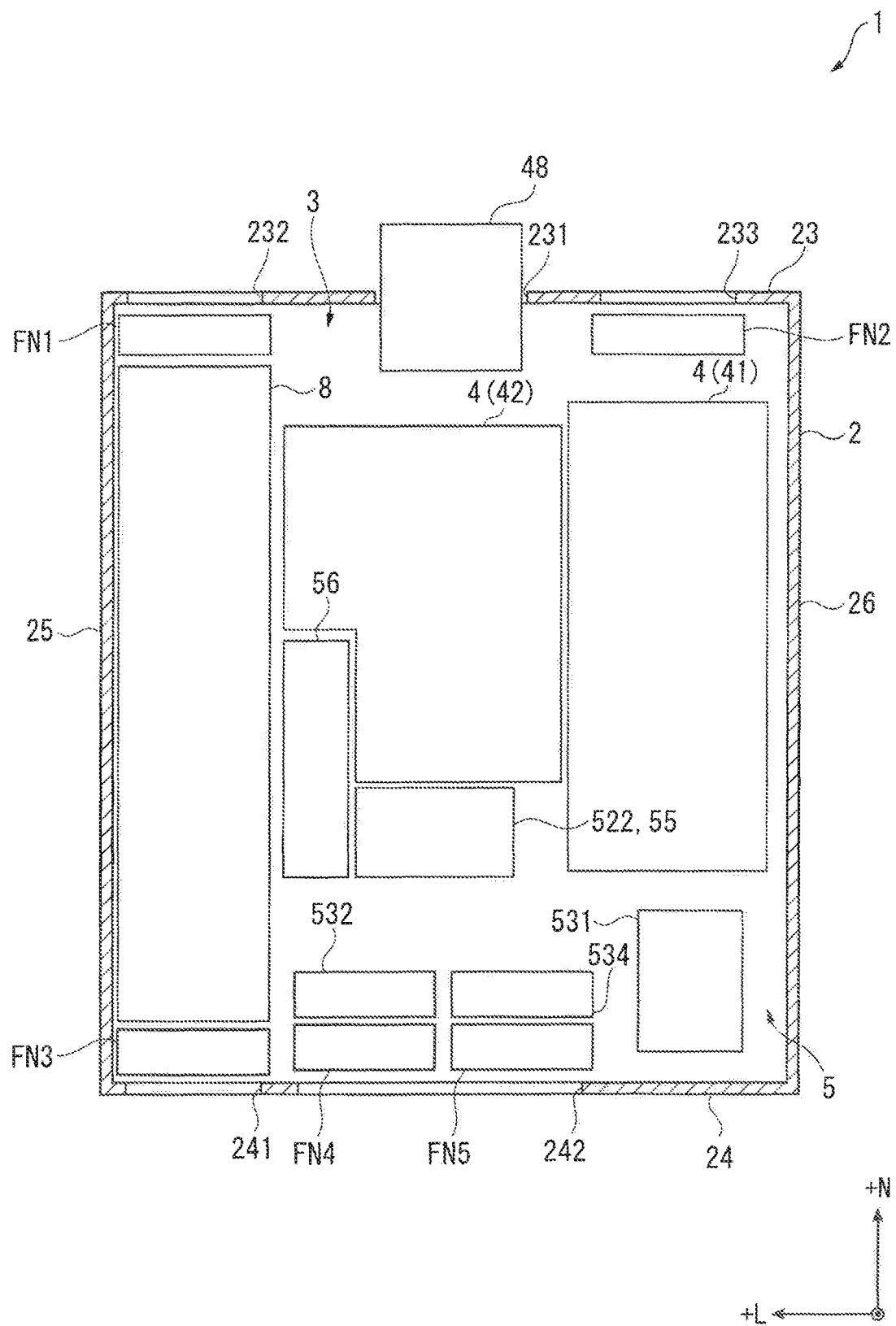
FIG. 1 is a schematic diagram showing configuration of a projector according to a first embodiment of the invention.

A first embodiment of the invention will hereinafter be described based on the accompanying drawings.
Schematic Configuration of Projector FIG. 1 is a schematic diagram showing a configuration of a projector 1 according to the present embodiment.

The projector 1 according to the present embodiment is a projection type display device for modulating the light emitted from a light source device 41 to thereby from, an image corresponding to image information, and then projecting the image on a projection target surface such as a screen in an enlarged manner. As shown in FIG. 1, the projector 1 is provided with an exterior housing 2 forming an exterior, and a device main body 3 housed in the exterior housing 2.

Although the details will be described later, one of the features provided to such a projector 1 is the configuration of a light modulation device 6.

Hereinafter, the configuration of the projector 1 will be described in detail.

Configuration of Exterior Housing

The exterior housing 2 is formed to have a roughly rectangular solid shape. The exterior housing 2 has a front surface part 23, a back surface part 24, a right side surface part 25 (a side surface part located on the right side viewed from the front surface part 23 side), and a left side surface part 26 (a side surface part located on the left side viewed from the front surface part 23 side), and in addition has a top surface part for connecting these surface parts 23 through 26 to each other on one end side, and a bottom surface part for connecting these surface parts 23 through 26 to each other on the other end side, although not shown in the drawings.

The front surface part 23 has an opening part 231 for exposing a part of a projection optical device 48 described later, and an introduction ports 232, 233 located so as to be shifted toward the left side surface part 26 and the right side surface part 25, respectively, with respect to the opening part 231 and taking a gas located outside the exterior housing 2 inside as a cooling gas.

The back surface part 24 has discharge ports 241, 242 for discharging the gas having flowed inside the exterior housing 2 to the outside of the exterior housing 2.

It should be noted that in the following description, among a +L direction, a +M direction and a +N direction perpendicular to each other, the +N direction is defined as a direction from the back surface part 24 toward the front surface part 23. Further, the +L direction is defined as a direction from the left side surface part 26 toward the right side surface part 25, and the +M direction is defined as a direction from the bottom surface part toward the top surface part. In other words, the +N direction is a direction from the lower side toward the upper side in the view shown in FIG. 1, the +L direction is a direction from the right aide toward the left side, and the +M direction is a direction from the back side toward the front side. Further, although not shown in the drawings, an opposite direction to the +N direction is defined as a −N direction. The same applies to a −L direction and a −M direction. It should be noted that in the following description, the +L direction, the +M direction and the +N direction are defined as directions (perpendicular directions) perpendicular to each other.

Configuration of Device Main Body

The device main body 3 is an internal constituent of the projector 1 housed in the exterior housing 2. The device main body 3 is provided with an image projection device 4, a cooling device 5, and a power supply device 8. Besides the above, although not shown in the drawings, the device main body 3 is provided with a control device for controlling an operation of the projector 1.

Among these constituents, the power supply device 8 is disposed along the right side surface part 25 inside the exterior housing 2. The power supply device 8 transforms the voltage supplied from the outside to supply the result to electronic components constituting the projector 1.

Configuration of Image Projection Device

Figure 2:
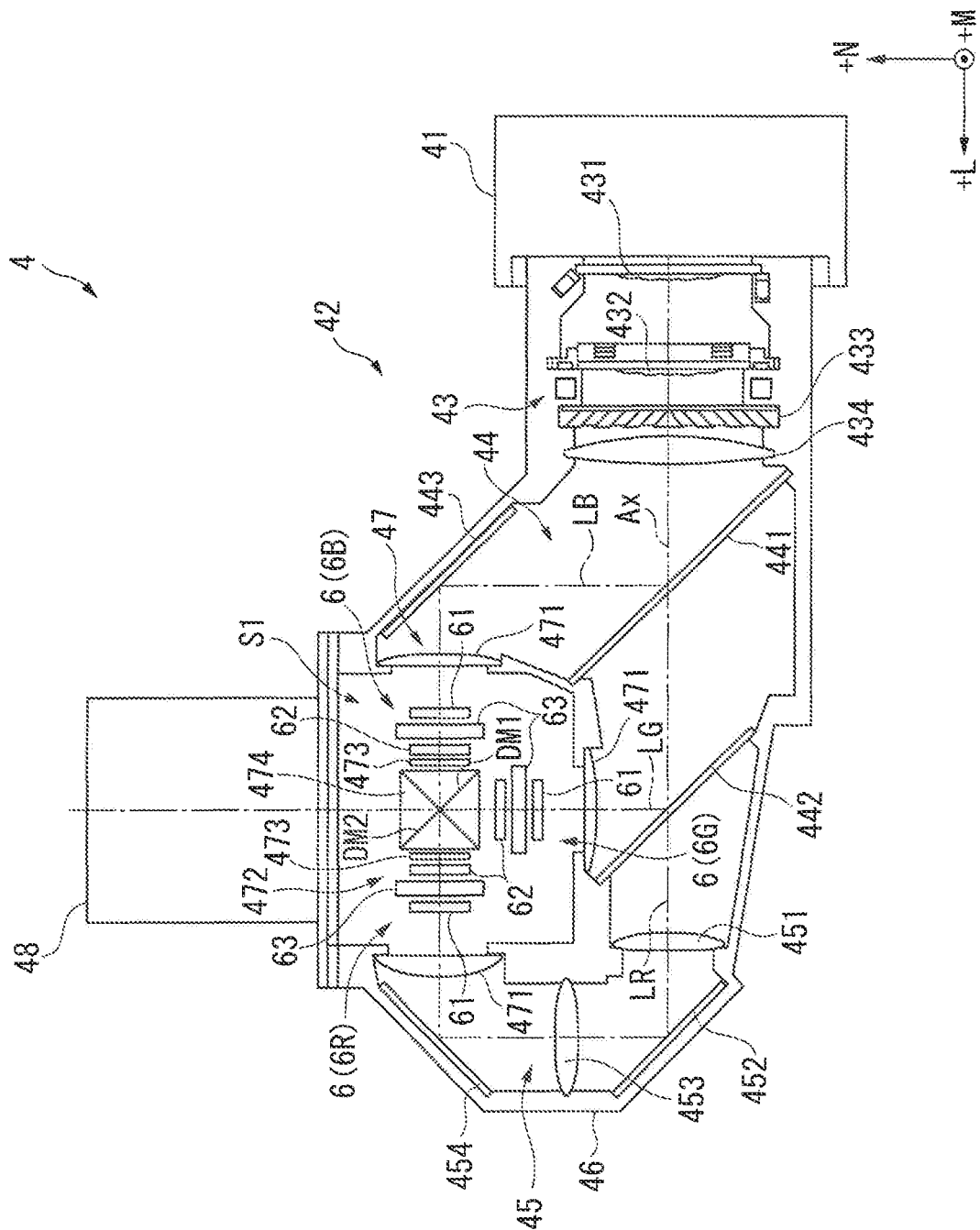
FIG. 2 is a schematic diagram showing a configuration of an image projection device in the first embodiment described above.

FIG. 2 is a schematic diagram showing a configuration of the image projection device 4.

The image projection device 4 is for forming and then projecting an image corresponding to image information input from the control device described above, and is disposed on the +N direction side and the −L direction side inside the exterior housing 2. As shown in FIG. 2, the image projection device 4 has a light source device 41, an image forming device 42 and a projection optical device 48.

Configuration of Light Source Device

Figure 3:
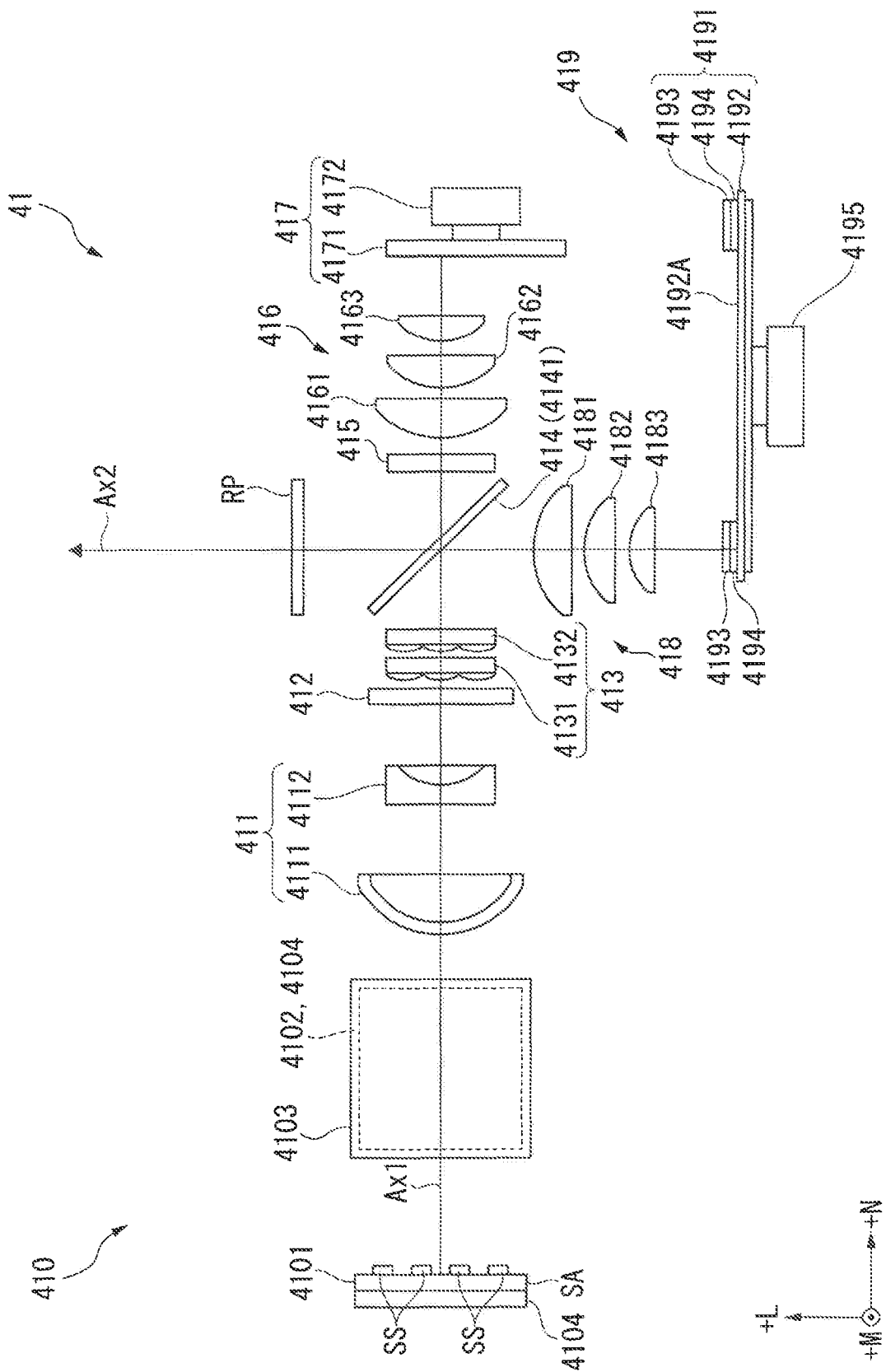
FIG. 3 is a schematic diagram showing a configuration of a light source device in the first embodiment described above.

FIG. 3 is a schematic diagram showing a configuration of the light source device 41.

The light source device 41 emits illumination light including red light, green light, and blue light to the image forming device 42. As shown in FIG. 3, the light source device 41 is provided with a light source section 410, an afocal optical element 411, a first retardation element 412, a homogenizer optical element 413, a light combining element 414, a second retardation element 415, a first light collecting element 416, a light diffusion element 417, a second light collecting element 418, a wavelength conversion device 419 and a third retardation element RP.

Among these constituents, the light source section 410, the afocal optical element 411, the first retardation element 412, the homogenizer optical element 413, the second retardation element 415, the first light collecting element 416 and the light diffusion device 417 are disposed on a first illumination optical axis Ax1 set in the light source device 41. In contrast, the second light collecting element 418, the wavelength conversion device 419, and the third retardation element RP are disposed on a second illumination optical axis Ax2 similarly set in the light source device 41, and crossing the first illumination optical axis Ax1. On an extended line of the second illumination optical axis Ax2, there is disposed a homogenizing device 43 described later.

Further, the light combining element 414 is disposed in a crossing part between the first illumination optical axis Ax1 and the second illumination optical axis Ax2.

Configuration of Light Source Section

The light source section 410 emits source light. The light source section 410 has a first light source 4101, a second light source 4102 and a light combining member 4103, and two light source cooling sections 4104.

The first light source 4101 is disposed along the L-M plane, and emits the source light toward the +N direction. The first light source 4101 has a light source array SA and a collimating element (not shown) for collimating and reducing in diameter the blue light emitted from the light source array SA.

The light source array SA has a configuration having solid-state light sources SS as laser diodes (LD) arranged in a matrix. These solid-state light sources SS each emit the blue light having a peak wavelength of, for example, 440 nm as the source light, but can also emit blue light having a peak wavelength of 446 nm or blue light having a peak wavelength of 460 nm. The source light having been emitted from such a light source array SA is collimated by the collimating element, and then enters the light combining member 4103 along the +N direction.

The second light source 4102 is disposed along the L-N plane, and emits the source light toward the +M direction. Although not shown in detail, the second light source 4102 has a light source array SA and a collimating element similarly to the first light source device 4101.

It should be noted that the solid-state light sources SS arranged in the light source array SA of the second light source 4102 each emit blue light having the same wavelength as that of the first light source 4101 described above as the source light. However, this is not a limitation, but it is also possible to dispose solid-state light sources respectively emitting blue light beams different in peak wavelength from each other so as to be mixed with each other in the first light source 4101 and the second light source 4102.

Further, the source light emitted from each of the solid-state light sources SS is s-polarized light in the present embodiment, but the source light can also be p-polarized light. Further, it is also possible to adopt a configuration in which each of the light sources 4101, 4102 has the solid-state light source SS for emitting excitation light as the s-polarized light, and the solid-state light source SS for emitting excitation light as the p-polarized light. In this case, the first retardation element 412 described later can be omitted.

The light combining member 4103 combines the source light having been emitted from the first light source 4101 toward the +N direction and the source light having been emitted from the second light source 4102 toward the +M direction with each other, and then emits the result toward the +N direction.

It should be noted that the light source section 410 can also have a configuration having only the first light source 4101, or can also have a configuration having a larger number of light sources. In the case in which the light source section 410 has only the first light source 4101, the light combining member 4103 can be omitted.

One of the two light source cooling sections 4104 is disposed on an opposite side to the light emission side of the light source array SA of the first light source 4101, and the other thereof is disposed on an opposite side to the light emission side of the light source array SA of the second light source 4102. These light source cooling sections 4104 transmits the heat transmitted from corresponding one of the light source arrays SA to a third refrigerant RE3 (see FIG. 5) as a liquid refrigerant flowing inside to thereby cool each of the solid-state light sources SS of the light source array SA. A configuration of the cooling device 5 for making the third refrigerant RE3 through these light source cooling sections 4104 will be described later in detail.

Configuration of Afocal Optical Element and First Retardation Element

The afocal optical element 411 has lenses 4111, 4112, reduces the diameter of the source light entering the afocal optical element 411 from the light source section 410, and then collimates and then emits the result.

The first retardation element 412 is a half-wave plate. By passing through the first retardation element 412, the source light as the s-polarized light entering the first retardation element 412 from the afocal optical element 411 is partially converted into the source light as the p-polarized light to thereby turn to the source light having the s-polarized light and the p-polarized light mixed with each other.

Configuration of Homogenizer Optical Element

The homogenizer optical element 413 has two multi-lenses 4131, 4132, and homogenizes the illuminance distribution of the source light entering illumination target areas in the light diffusion device 417 and the wavelength conversion device 419. It should be noted that the homogenizer optical element 413 is not limited to be disposed on the light emission side of the first retardation element 412, but can also be disposed between the afocal optical element 411 and the first retardation element 412.

Configuration of Light Combining Element

The light combining element 414 has a polarization separation layer 4141 tilted about 45° with respect to each of the first illumination optical axis Ax1 and the second illumination optical axis Ax2.

The polarization separation layer 4141 has a property of separating the s-polarized light and the p-polarized light included in the source light entering the polarization separation layer 4141 via the homogenizer optical element 413 from each other, and in addition has a property of transmitting the fluorescence generated in the wavelength conversion device 419 irrespective of the polarization state of the fluorescence. In other words, the polarization separation layer 4141 has wavelength-selective polarization separation characteristics of separating the s-polarized light and the p-polarized light from each other with respect to the blue light while transmitting both of the s-polarized light and the p-polarized light with respect to the green light and the red light.

Out of the source light entering the light combining element 414 also functioning as a light separation element as described above from the homogenizer optical element 413, the p-polarized light is transmitted by the light combining element 414 toward the second retardation element 415 along the first illumination optical axis Ax1, and the s-polarized light is reflected by the light combining element 414 toward the second light collecting element 418 along the second illumination optical axis Ax2. Further, the light combining element 414 combines the source light entering the light combining element 414 via the second retardation element 415, and the fluorescence entering the light combining element 414 via the second light collecting element 418 with each other.

Configuration of Second Retardation Element and First Light Collecting Element

The second retardation element 415 is a quarter-wave plate, converts the source light as the p-polarized light entering the second retardation element 415 from the light combining element 414 into the source light as circularly polarized light, and converts the source light (circularly polarized light in the opposite rotational direction to that circularly polarized light) entering the second retardation element 415 from the first light collecting element 416 into the s-polarized light.

The first light collecting element 416 collects (converges) the source light having passed through the second retardation element 415 to the light diffusion device 417, and further, collimates the source light entering the first light collecting element 416 from the light diffusion device 417. The first light collecting element 416 is constituted by three lenses 4161 through 4163, but the number of lenses constituting the first light collecting element 416 is not limited to 3.

Configuration of Light Diffusion Device

The light diffusion device 417 has a light diffusion element 4171, and a rotating device 4172 for rotating the light diffusion element 4171.

Among these constituents, the light diffusion element 4171 has a ring-like reflecting layer centered on the rotational axis of the rotation by the rotating device 4172. The reflecting layer diffuses the source light entering the reflecting layer at substantially the same diffusion angle as that of the fluorescence generated in and emitted from the wavelength conversion device 419. Specifically, the reflecting layer performs the Lambert reflection on the incident light.

The source light having been diffusely reflected by such a light diffusion element 4171 enters the second retardation element 415 once again via the first light collecting element 416. The circularly polarized light having entered the light diffusion element 4171 turns to the circularly polarized light in the opposite rotational direction when being reflected by the light diffusion element 4171, and is converted into the source light as the s-polarized light having the polarization direction rotated as much as 90° with respect to the source light as the p-polarized light passing through the light combining element 414 in the process of passing through the second retardation element 415. The source light as the s-polarized light is reflected by the polarization separation layer 4141 described above so as to be parallel to the second illumination optical axis Ax2, and then enters the homogenizing device 43 described later as the blue light via the third retardation element RP.

Configuration of Second Light Collecting Element

The source light as the s-polarized light having passed through the homogenizer optical element 413 and then having been reflected by the polarization separation layer 4141 described above enters the second light collecting element 418. The second light collecting element 418 converges the source light entering the second light collecting element 418 to the illumination target area (a wavelength conversion layer 4193 described later) of the wavelength conversion device 419, and further, collimates the fluorescence entering the second light collecting element 418 from the wavelength conversion device 419. Similarly to the first light collecting element 416, the second light collecting element 418 is constituted by three lenses 4181 through 4183, but the number of lenses provided to the second light collecting element 418 is not limited to 3.

Configuration of Wavelength Conversion Device

The wavelength conversion device 419 has a wavelength conversion element 4191 for converting the wavelength of the light having entered the wavelength conversion element 4191, and a rotating device 4195 for rotating the wavelength conversion element 4191.

The wavelength conversion element 4191 has a support member 4192 having a disk-like shape, and a wavelength conversion layer 4193 and a reflecting layer 4194 located on a surface 4192A on the incident side of the source light in the support member 4192.

The wavelength conversion layer 4193 is a phosphor layer including a phosphor excited by the incidence of the source light described above to diffusely emit the fluorescence (the fluorescence having a peak wavelength in a wavelength band of, for example, 500 through 700 nm) as non-polarized light. In other words, the wavelength conversion layer 4193 performs the wavelength conversion on the blue light entering the wavelength conversion layer 4193 into the fluorescence. A part of the fluorescence generated in such a wavelength conversion layer 4193 is emitted toward the second light collecting element 418, and another part thereof is emitted toward the reflecting layer 4194.

The reflecting layer 4194 is disposed between the wavelength conversion layer 4193 and the support member 4192, and reflects the fluorescence entering the reflecting layer 4194 from the wavelength conversion layer 4193 toward the second light collecting element 418.

The fluorescence diffusely emitted from such wavelength conversion element 4191 passes through the second light collecting element 418, the polarization separation layer 4141 and the third retardation element RP along the second illumination optical axis Ax2, and then enters the homogenizing device 43. Specifically, the fluorescence passes through the polarization separation layer 4141 to thereby be combined with the source light as the blue light having been reflected by the polarization separation layer 4141, and then enters the homogenizing device 43 via the third retardation element RP as the white illumination light.

Configuration of Third Retardation Element

The third retardation element RP is a half-wave plate, and converts the illumination light entering the third retardation element RP from the light combining element 414 into the circularly polarized light having the s-polarized light and the P-polarized light mixed with each other.

A part of such a light source device 41 is disposed inside a second sealed housing 541 (see FIG. 5) as a roughly sealed housing. Specifically, the light diffusion device 417 and the wavelength conversion device 419 as the cooling targets are disposed inside the second sealed housing 541 described later. Further, although described later in detail, a fourth refrigerant RE4 as a gaseous refrigerant located inside the second sealed housing 541 flows through the light diffusion device 417 and the wavelength conversion device 419, and thus, the devices 417, 419 are cooled.

Configuration of Image Forming Device

The image forming device 42 modulates the illumination light entering the image forming device 42 from the light source device 41 described above to form the image to be projected by the projection optical device 48. As shown in FIG. 2, the image forming device 42 has the homogenizing device 43, a color separation device 44, a relay device 45, an optical component housing 46 and an electro-optic device 47.

Configuration of Homogenizing Device

The homogenizing device 43 homogenizes the illuminance distribution of the illumination light entering the homogenizing device 43 from the light source device 41. Such a homogenizing device 43 is provided with a first lens array 431, a second lens array 432, polarization conversion element 433, and a superimposing lens 434.

Among these constituents, the polarization conversion element 433 uniforms the illumination light entering the polarization conversion element 433 into the s-polarized light and emits the result. It should be noted that the polarization conversion element 433 can also be provided with a configuration of uniforming the illumination light into the p-polarized light and emitting the result.

Configuration of Color Separation Device

The color separation device 44 separates the light beam entering the color separation device 44 from the homogenizing device 43 into three colored light beams of red (R), green (G), and blue (B). The color separation device 44 has dichroic mirrors 441, 442, and a reflecting mirror 443. Besides the above, the color separation device 44 can also be provided with a lens which the blue light LB having been reflected by the dichroic mirror 441 enters, and a lens which the green light LG and the red light LR having passed through the dichroic mirror 441 enter.

Configuration of Relay Device

The relay device 45 is disposed on the light path of the red light LR having passed through the dichroic mirror 442 to guide the red light LB to a field lens 471 for the red light LR. The relay device 45 is provided with an incident side lens 451, a reflecting mirror 452, a relay lens 453, and a reflecting mirror 454. It should be noted that it is assumed in the present embodiment that the relay device 45 is provided with a configuration of transmitting the red light LB, but the relay device 45 is not limited to this configuration, and can also be provided with a configuration of transmitting, for example, the blue light LB.

Configuration of Optical Component Housing

The optical component housing 46 is a box-like housing having an illumination optical axis Ax set inside. At positions on the illumination optical axis Ax inside the optical component housing 46, there are disposed the homogenizing device 43, the color separation device 44 and the relay device 45 described above. The light source device 41 is disposed so that the second illumination optical axis Ax2 described above corresponds to the illumination optical axis Ax, and the electro-optic device 47 and the projection optical device 48 are also disposed in accordance with the illumination optical axis Ax.

Such an optical component housing 46 are combined with another housing to constitute a first sealed housing 511 described later. The first sealed housing 511 forms a first space S1 inside of which is roughly sealed. Inside such a first sealed housing 511, there is disposed the electro-optic device 47 in addition to the polarization conversion element 433.

Configuration of Electro-Optic Device

The electro-optic device 47 modulates each of the colored light beams, which have been separated from each other, and then combines the colored light beams thus modulated with each other to form image light. The electro-optic device 47 has the field lenses 471 respectively provided for the colored light beams, and an image forming unit 472.

The field lenses 471 are each a lens for collimating the incident light, and are each disposed by being inserted in a groove part provided to the optical component housing 46 described above.

The image forming unit 472 is a unit consisting of three light modulation devices 6, two retardation elements 473 and one light combining device 474 integrated with each other.

The light modulation devices 6 (the light modulation devices for red, green, and blue are denoted by 6R, 6G, and 6B, respectively) each modulate the incident colored light beam via the corresponding field lens 471 to thereby form an image corresponding to the image information. These light modulation devices 6 has polarization plates 61, 62 and a liquid crystal panel 63 disposed between these polarization plates 61, 62. In other words, the light modulation devices 6 each have a liquid crystal panel 63, and an incident side polarization plate 61 and an emission side polarization plate 62 located respectively on the light incidence side and the light emission side with respect to the liquid crystal panel 63. In other words, the light modulation devices 6 are each constituted by a liquid crystal light valve.

It should be noted that, in the present embodiment, the light modulation device 6G corresponds to a first light modulation device, and the light modulation devices 6Bm 6R respectively correspond to a second light modulation device and a third light modulation device.

Among these devices, although the details will be described later, the liquid crystal panel 63 is configured so that a liquid refrigerant (a second refrigerant RE2 described later) can flow inside the liquid crystal panel 63. Further, the liquid crystal panel 63 transfers the heat having been transferred from the incident side polarization plate 61 and the emission side polarization plate 62 to the liquid refrigerant in addition to the heat generated in the liquid crystal panel 63 to thereby cool the liquid crystal panel 63 and each of the polarization plates 61, 62.

The configuration of such light modulation devices 6 will be described later in detail.

The light combining device 474 combines the colored light beams emitted from the respective light modulation devices 6 with each other to form the image described above. The light combining device 474 is formed of a cross dichroic prism having a roughly rectangular solid shape (a roughly quadrangular prism shape) in the present embodiment. The cross dichroic prism is a prism having a roughly rectangular solid shape consisting of four prisms each shaped like a right triangular prism bonded to each other, and on the boundary faces between the four prisms, there are located two dielectric multilayer films DM1, DM2.

Among these dielectric multilayer films DM1, DM2, the dielectric multilayer film DM1 has a function of reflecting the blue light LB while transmitting the green light LG and the red light LR, and the dichroic multilayer film DM2 has a function of reflecting the red light LR while transmitting the blue Light LB and the green light LG.

The light combining device 474 has three planes of incidence which are opposed to the respective light modulation devices 6, and which the colored light beams having been transmitted through the respective light modulation devices 6 respectively enter, and a single emission surface. Further, among the colored light beams having entered the light combining device 474 from the respective light modulation devices 6 via the respective planes of incidence, the blue light LB and the red light LR are reflected by the dielectric multilayer films DM1, DM2 described above toward the projection optical device 48, while the green light LG passes through the dielectric multilayer films DM1, DM2 toward the projection optical device 48. Thus, the colored light beams LB, LG, and LR are combined with each other to form the image light. Then, the image light is emitted from the emission surface, and then enters the projection optical device 48.

One of the two retardation elements 473 is disposed between the light modulation device 6B and the light combining device 474 on the light path of the blue light LB, and the other thereof is disposed between the light modulation device 6R and the light combining device 474 on the light path of the red light LR. These retardation elements 473 are each a half-wave plate, and each rotates the polarization direction of the colored light beam entering the retardation element 473 from the corresponding one of light modulation devices 6B, 6R as much as 90°. Thus, the blue light LB and the red light LR having passed through the retardation element 473 turn to polarized light beams (polarized light beams hard to cause loss when being reflected) suitable for the reflection by the dielectric multilayer films DM1, DM2.

It should be noted that the reason that the retardation element 473 is not disposed between the light modulation device 6B and the light combining device 474 on the light path of the green light LG is that the green light LG is transmitted through the dielectric multilayer films DM1, DM2, and therefore, in order to make the green light LG turn to a polarized light beam (a polarized light beam hard to cause loss when being transmitted) suitable for the transmission by these dielectric multilayer films DM1, DM2, the retardation element 473 is not disposed.

Figure 4:
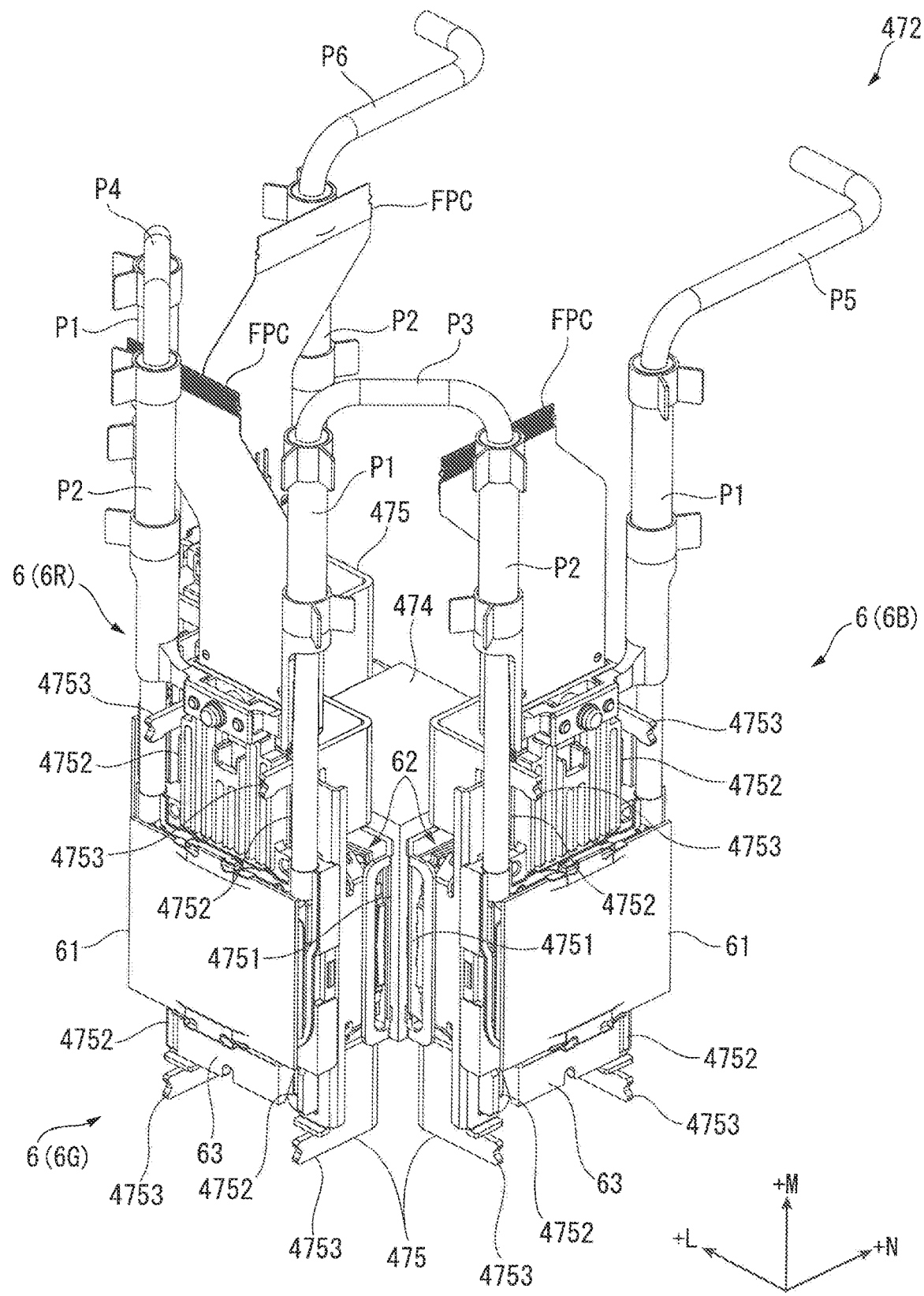
FIG. 4 is a perspective view of an image forming unit in the first embodiment described above viewed from a light incidence side.

FIG. 4 is a perspective view of the image forming unit 472 viewed from the light incidence side.

As shown in FIG. 4, such an image forming unit 472 further includes holding members 475 disposed on the respective planes of incidence of the light combining device 474 to hold the light modulation devices 6. These holding members 475 each have an attachment part 4751 to be attached to the corresponding plane of incidence of light, and four insertion parts 4752 and four arm parts 4753 projecting toward the light modulation device 6.

Among these parts, the insertion parts 4752 are inserted into the light modulation device 6, and then adhesively fixed with an ultraviolet cure adhesive or the like.

The arm parts 4753 are located on the four corners of the holding member 475 on the outer side of the insertion parts 4752, and projects more than the insertion parts 4752. These arm parts 4753 guide the light modulation device 6 so that the insertion parts 4752 are inserted into the light modulation device 6, and further hold the light modulation device 6 (more precisely, a frame 65 of the liquid crystal panel 63) by clamping.

It should be noted that although not shown in the drawings, among the three holding members 475, the holding members 475 for holding the light modulation devices 6B, 6R respectively hold the retardation elements 473 described above disposed on the light paths of the blue light LB and the red light LR.

It should be noted that as shown FIG. 4, to the liquid crystal panels 63 of the respective light modulation devices 6, there are connected pipes P1, P2 through which the liquid refrigerant flows.

Among the pipes P1, P2 connected to the light modulation device 6B, the pipe P2 located on the light modulation device 6G side is connected via a relay pipe P3 to the pipe P1 located on the light modulation device 6B side out of the pipes P1, P2 connected to the light modulation device 6G.

Further, among the pipes P1, P2 connected to the light modulation device 6G, the pipe P2 located on the light modulation device 6R side is connected via a relay pipe P4 to the pipe P1 located on the light modulation device 6G side out of the pipes P1, P2 connected to the light modulation device 6R.

Further, the pipe P1 connected to the light modulation device 6B is connected to a pipe CM12 (see FIG. 5) for supplying the second refrigerant RE2 as the liquid refrigerant via a relay pipe P5, and the pipe P2 connected to the light modulation device 6R is connected to a pipe CM22 (see FIG. 5) via a relay pipe P6.

Therefore, the second refrigerant RE2 supplied via the pipe CM12 flows through the light modulation device 6B, the light modulation device 6G and the light modulation device 6R in this order. The order of the flow of the second refrigerant RE2 is set based on the descending order of the necessity of cooling. However, the order of the flow of the second refrigerant RE2 is not limited to the above, but can also be modified in the light modulation devices 6E, 6G, and 6R taking the arrangement of the light modulation devices 6 and so on into consideration. It should be noted that the pipes CM12, CM22 will be described later in detail.

Configuration of Projection Optical Device

The projection optical device 48 shown in FIG. 2 is disposed so as to partially be exposed from the opening part 231 (see FIG. 1). The projection optical device 48 projects the image light entering the projection optical device 48 from the light combining device 474 (the image forming device 42) on the projection target surface described above in an enlarged manner to thereby display the image formed by the image light. Such a projection optical device 48 can be configured as a combination lens having a plurality of lenses arranged in a lens tube.

Configuration of Cooling Device

Figure 5:
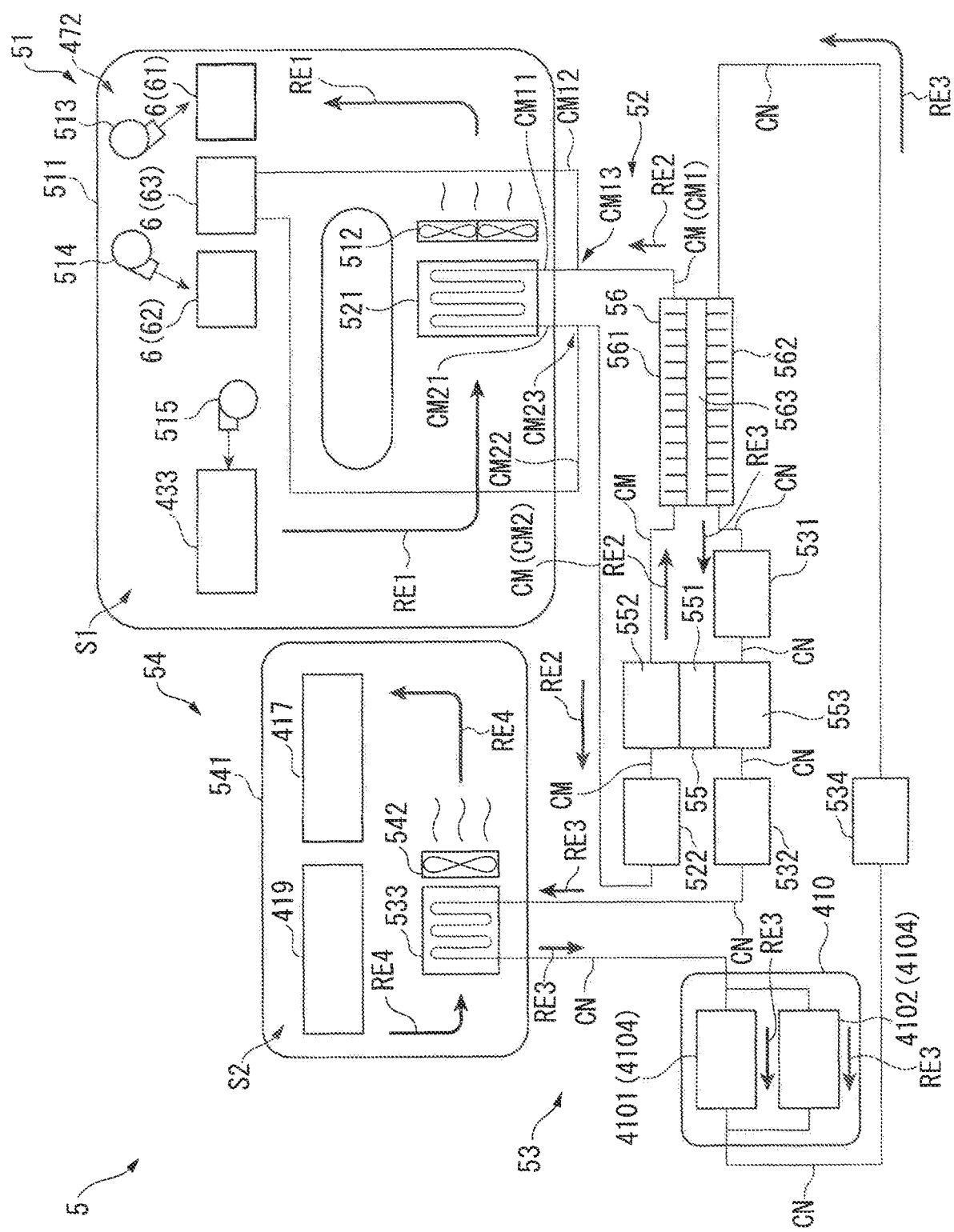
FIG. 5 is a schematic diagram showing a configuration of a cooling device in the first embodiment described above.

FIG. 5 is a schematic diagram showing a configuration of the cooling device 5.

The cooling device 5 cools the cooling targets constituting the projector 1. The cooling device 5 is provided with a first circulation channel 51, a second circulation channel 52, a third circulation channel 53 and a fourth circulation channel 54 as a configuration for cooling the image projection device 4 as shown in FIG. 5. These circulation channels 51 through 54 are each a flow channel for circulating a gaseous refrigerant or a liquid refrigerant to thereby cool the cooling targets.

Each of the circulation channels 51 through 54 will hereinafter be described.

Configuration of First Circulation Channel

The first circulation channel 51 is a flow channel through which the first refrigerant RE1 as a gas in the first sealed housing 511 circulates, and cools the light modulation devices 6 and the polarization conversion element 433 as the cooling targets with the first refrigerant RE1. The first circulation channel 51 is configured including the first sealed housing 511, a circulation fan 512, blast fans 513 through 515, and a first heat exchanger 521.

It should be noted that the first refrigerant RE1 is only required to be a gas, and can also be a gas (e.g., nitrogen gas or helium gas) other than air.

The first sealed housing 511 is configured by the optical component housing 46 and another housing combined with each other as described above, and forms the first space S1 described above inside. Inside the first sealed housing 511, there are disposed the light modulation devices 6 and the polarization conversion element 433, the circulation fan 512, the blast fans 513 through 515 and the first heat exchanger 521.

The first heat exchanger 521 constitutes the first circulation channel 51 and the second circulation channel 52. The first heat exchanger 521 transfers the heat of the first refrigerant RE1 to the second refrigerant RE2 flowing inside to thereby cool the first refrigerant RE1.

The circulation fan 512 is a fan for circulating the first refrigerant RE1 having been cooled by the first heat exchanger 521 inside the first sealed housing 511.

In the present embodiment, the blast fans 513, 514 are disposed for each of the light modulation devices 6, and make the first refrigerant RE1 flow through the corresponding light modulation device 6. In the detailed description, the blast fan 513 corresponds to a second circulation device, and makes the first refrigerant RE1 flow along the incident side polarization plate 61 and the liquid crystal panel 63 of the corresponding light modulation device 6. Further, the blast fan 514 makes the first refrigerant RE1 flow along the liquid crystal panel 63 and the emission side polarization plate 62 of the corresponding light modulation device 6. It should be noted that it is also possible to dispose a single blast fan 513 and a single blast fan 514, and divide the flow of the first refrigerant RE1 made to flow by the blast fan 513 to flow along the respective light modulation devices 6, and it is also possible to divide the flow of the first refrigerant RE1 made to flow by the blast fan 514 to flow along the respective light modulation devices 6.

The blast fan 515 makes the first refrigerant RE1 flow along the polarization conversion element 433.

In such a first circulation channel 51, the first refrigerant RE1 having cooled the polarization conversion element 433 and the light modulation devices 6 is suctioned by the circulation fan 512 to flow through the first heat exchanger 521. Then, the first refrigerant RE1 having been cooled by the first heat exchanger 521 flows once again along the light modulation devices 6 and the polarization conversion element 433. As described above, the first refrigerant RE1 circulates inside The first sealed housing 511.

Configuration of Second Circulation Channel

The second circulation channel 52 is a flow channel through which the second refrigerant RE2 as a liquid refrigerant circulates, and cools the first refrigerant RE1, and at the same time cools the light modulation devices 6. The second circulation channel 52 is configured including the first heat exchanger 521 described above, the light modulation devices 6 (the liquid crystal panels 6), a tank 522, a pump 55 and a second heat exchanger 56, and a plurality of connection members CM for connecting these constituents to each other.

It should be noted that the connection members CM are each a tubular member formed so that the second refrigerant RE2 can flow through the tubular member. Further, as such a refrigerant RE2, there can be cited water and an antifreeze solution such as propylene glycol.

The second refrigerant RE2 flows through the first heat exchanger 521 as described above.

The tank 522 temporarily retains the second refrigerant RE2. The second refrigerant RE2 retained in the tank 522 is suctioned by the pump 55.

The pump 55 corresponds to a first circulation device. The pump 55 has a pressure-feeding section 551 and inflow chambers 552, 553.

The second refrigerant RE2 flows into the inflow chamber 552 from the tank 522. By driving the pressure-feeding section 551, the second refrigerant RE2 having flowed into the inflow chamber 552 is made to flow through the first heat exchanger 521 via a heat receiving section 561 of the second heat exchanger 56. Further, the third refrigerant RE3 circulating the third circulation channel 53 described later flows into the inflow chamber 553, and the third refrigerant RE3 having entered the inflow chamber 553 will be described later in detail.

The second heat exchanger 56 is provided with the heat receiving section 561 through which the second refrigerant RE2 having been pressure-fed by the pump 55 flows, a heat radiation section 562 through which the third refrigerant RE3 flows, and a heat transmission section 563 for transferring the heat of the second refrigerant RE2 having been received by the heat receiving section 561 to the heat radiation section 562. Due to the second heat exchanger 56, the second refrigerant RE2 the heat of which has been transferred to the third refrigerant RE3, and which has thus been cooled, is made to flow through the first heat exchanger 521 described above.

Here, among the plurality of connection members CM, the connection member CM1 through which the second refrigerant RE2 having been cooled by the second heat exchanger 56 flows has a pipe CM11 connected to the first heat exchanger 521, the pipe CM12 connected to the pipe P1 (see FIG. 4) of the light modulation device 6B, and a branch part CM13 for distributing the second refrigerant RE2 to these pipes CM11, CM12. Due to such a configuration of the connection member CM1, a part of the second refrigerant RE2 having flowed into the connection member CM1 flows through the first heat exchanger 521, and another part thereof flows through the light modulation devices 6. Therefore, the light modulation devices 6 are cooled not only by the first refrigerant RE1 but also by the second refrigerant RE2.

Further, among the plurality of connection members CM, the connection member CM2 for making the second refrigerant RE2 flow to the tank 522 has a pipe CM21 to be connected to the first heat exchanger 521, the pipe CM22 to be connected to the pipe P2 of the light modulation device 6R, and a junction part CM23 for connecting these pipes CM21, CM22 to each other. Due to such a connection member CM2, the second refrigerant RE2 having flowed through the first heat exchanger 521 and the second refrigerant RE2 having flowed through the light modulation devices 6 are merged in the junction part CM23 to flow into the tank 522.

It should be noted that although one light modulation device 6 is shown alone in FIG. 5, the second refrigerant RE2 flowing via the pipe CM12 flows through the light modulation devices 6B, 6G, and 6R in sequence in the present embodiment as described above. However, this is not a limitation, and it is also possible to adopt a configuration in which the pipes P1 connected to the respective light modulation devices 6 are connected to the pipe PCM12, and the pipes P2 of the respective light modulation devices 6 are connected to the pipe CM22.

In such a second circulation channel 52, the second refrigerant RE2 retained in the tank 522 is suctioned by the pump 55 to be pressure-fed to the second heat exchanger 56. The second refrigerant RE2 which has flowed through the heat receiving section 561 of the second heat exchanger 56 to thereby be cooled flows through the first heat exchanger 521 and each of the light modulation devices 6 due to the connection member CM1. The second refrigerant RE2 to which the heat of the first heat exchanger 521 and each of the light modulation devices 6 has been transferred is made to flow into the tank 522 via the connection member CM2, and is then retained in the tank 522 once again. As described above, the second refrigerant RE2 circulates through the second circulation channel 52 while cooling the first heat exchanger 521 and each of the light modulation devices 6. It should be noted that as described above, the heat of the second refrigerant RE2 is transferred to the third refrigerant RE3 in the second heat exchanger 56.

Configuration of Fourth Circulation Channel

Here, the fourth circulation channel 54 will be described in advance.

The fourth circulation channel 54 is a flow channel for circulating a fourth refrigerant RE4 as a gas to thereby cool the light diffusion device 417 and the wavelength conversion device 419 as the cooling targets. The fourth circulation channel 54 is provided with a second sealed housing 541, and a third heat exchanger 533 and a circulation fan 542 each disposed inside the second sealed housing 541. It should be noted that the fourth refrigerant RE4 can be the same as or different from the first refrigerant RE1 in components.

The second sealed housing 541 forms a roughly sealed second space 52 inside. Inside such a second sealed housing 541, there are disposed the light diffusion device 417 and the polarization conversion element 419. Thus, the dust can be prevented from adhering to the light diffusion device 417 and the wavelength conversion device 419.

The third heat exchanger 533 constitutes the third circulation channel 53 in addition to the fourth circulation channel 54. The third heat exchanger 533 transfers the heat of the fourth refrigerant RE4 to the third refrigerant RE3 flowing inside to thereby cool the fourth refrigerant RE4.

The circulation fan 542 circulates the fourth refrigerant RE4 inside the second sealed housing 541. The circulation fan 542 makes the fourth refrigerant RE4 having been cooled in the third heat exchanger 533 flow along the light diffusion device 417 and the wavelength conversion device 419 to thereby cool these constituents.

It should be noted that in FIG. 5, the fourth refrigerant RE4 is illustrated so as to flow along the light diffusion device 417 and then flow along the wavelength conversion device 419. However, the order of the flow of the fourth refrigerant RE4 can be reversed, and it is also possible for the flow channel of the fourth refrigerant RE4 to be a flow channel in which the fourth refrigerant RE4 divided into two respectively flows along the light diffusion device 417 and the wavelength conversion device 419.

Configuration of Third Circulation Channel

The third circulation channel 53 is a flow channel for circulating the third refrigerant RE3 as the liquid refrigerant to thereby cool the second refrigerant RE2 and the fourth refrigerant RE4, and in addition cool the first light source 4101 and the second light source 4102 described above. The third circulation channel 53 is configured including a tank 531, the pump 55, a first radiator 532, the third heat exchanger 533, two light source cooling sections 4104, a second radiator 534 and the second heat exchanger 56, and a plurality of connection members CN for connecting these constituents to each other.

Among these constituents, the connection members CN are each a tubular member through which the third refrigerant RE3 can flow. It should be noted that the third refrigerant RE3 can be the same as or different from the second refrigerant RE2 in components.

The tank 531 is connected to the heat radiation section 562 of the second heat exchanger 56 described above, and temporarily retains the third refrigerant RE3.

The third refrigerant RE3 having been made to flow into the inflow chamber 553 from the tank 531 by the pressure-feeding section 551 described above is pressure-fed by the pump 55 to the first radiator 532 via the connection members CN.

The first radiator 532 cools the third refrigerant RE3 flowing through the third heat exchanger 533. Specifically, the first radiator 532 transfers the heat received from the third refrigerant RE3 pressure-fed from the pump 55 and flowing inside the first radiator 532 to the cooling gas flowing through the first radiator 532 to thereby cool the third refrigerant RE3. It should be noted that a cooling fan FN4 (see FIG. 1) for making the cooling gas flow through the first radiator 532 will be described later in detail.

The third heat exchanger 533 is disposed inside the second sealed housing 541 as described above, and transfers the heat of the fourth refrigerant RE4 to the third refrigerant RE3 to cool the fourth refrigerant RE4. The third refrigerant RE3 having flowed through the third heat exchanger 533 flows through the light source cooling sections 4104.

The light source cooling sections 4104 are respectively provided to the first light source 4101 and the second light source 4102 (see FIG. 3) as described above. The third refrigerant RE3 divided by the flow dividing part provided to the connection members CN flows through each of the light source cooling sections 4104. Then, the light source cooling sections 4104 each transfer the heat having been transferred from the corresponding light source array SA to the third refrigerant RE3 to cool the light source array SA (the solid-state light sources SS). The third refrigerant RE3 having flowed through these light source cooling sections 4104 is merged by the junction part provided to the connection members CN to flow through the second radiator 534.

The second radiator 534 transfers the heat of the third refrigerant RE3 flowing inside to the cooling gas flowing through the second radiator 534 to thereby cool the third refrigerant RE3. The third refrigerant RE3 having been cooled by the second radiator 534 is made to flow through the heat radiation section 562 of the second heat exchanger 56 described above. It should be noted that a cooling fan FN5 (see FIG. 1) for making the cooling gas flow through the second radiator 534 will be described later in detail.

In such a third circulation channel 53, the third refrigerant RE3 retained in the tank 531 is pressure-fed by the pump 55, and is supplied to the third heat exchanger 533 in the second sealed housing 541 via the first radiator 532. Due to the third heat exchanger 533, the fourth refrigerant RE4 is cooled, and the third refrigerant RE3 having flowed through the third heat exchanger 533 flows through the light source cooling sections 4104 to cool the light sources 4101, 4102 (the light source arrays SA). The third refrigerant RE3 having flowed through these light source cooling sections 4104 is cooled in the second radiator 534, and then flows into the heat radiation section 562 of the second heat exchanger 56. The third refrigerant RE3 to which the heat of the second refrigerant RE2 has been transferred in the heat radiation section 562 is retained once again in the tank 531. As described above, the third refrigerant RE3 circulates through the third circulation channel 53.

Arrangement of Fans

In addition to the configuration described above, the cooling device 5 is provided with intake fans FN1, FN2, an exhaust fan FN3, and the cooling fans FN4, FN5 disposed inside the exterior housing 2 as shown in FIG. 1.

The intake fans FN1, FN2 are disposed so as to correspond respectively to the introduction ports 232, 233, and introduce the gas located outside the exterior housing 2 inside as the cooling gas via the introduction ports 232, 233.

The exhaust fan FN3 is disposed in accordance with the discharge port 241, and discharges the cooling gas having flowed inside the exterior housing 2 to cool the cooling targets to the outside of the exterior housing 2 via the discharge port 241.

The cooling fans FN4, FN5 are each disposed in accordance with the discharge port 242. On the upstream side (i.e., on the +N direction side) of the cooling gas made to flow by these cooling fans FN4, FN5, there are disposed the first radiator 532 and the second radiator 534 described above.

When these cooling fans FN4, FN5 are driven, the cooling gas having been introduced inside the exterior housing 2 flows through the first radiator 532 and the second radiator 534, and these radiators 532, 534 transfer the heat of the third refrigerant RE3 to the cooling gas flowing therethrough. Thus, the third refrigerant RE3 is cooled. Then, the cooling gas having flowed through the radiators 532, 534 is discharged outside the exterior housing 2 from the discharge port 242 by the cooling fans FN4, FN5.

Configuration of Light Modulation Devices

Figure 6:
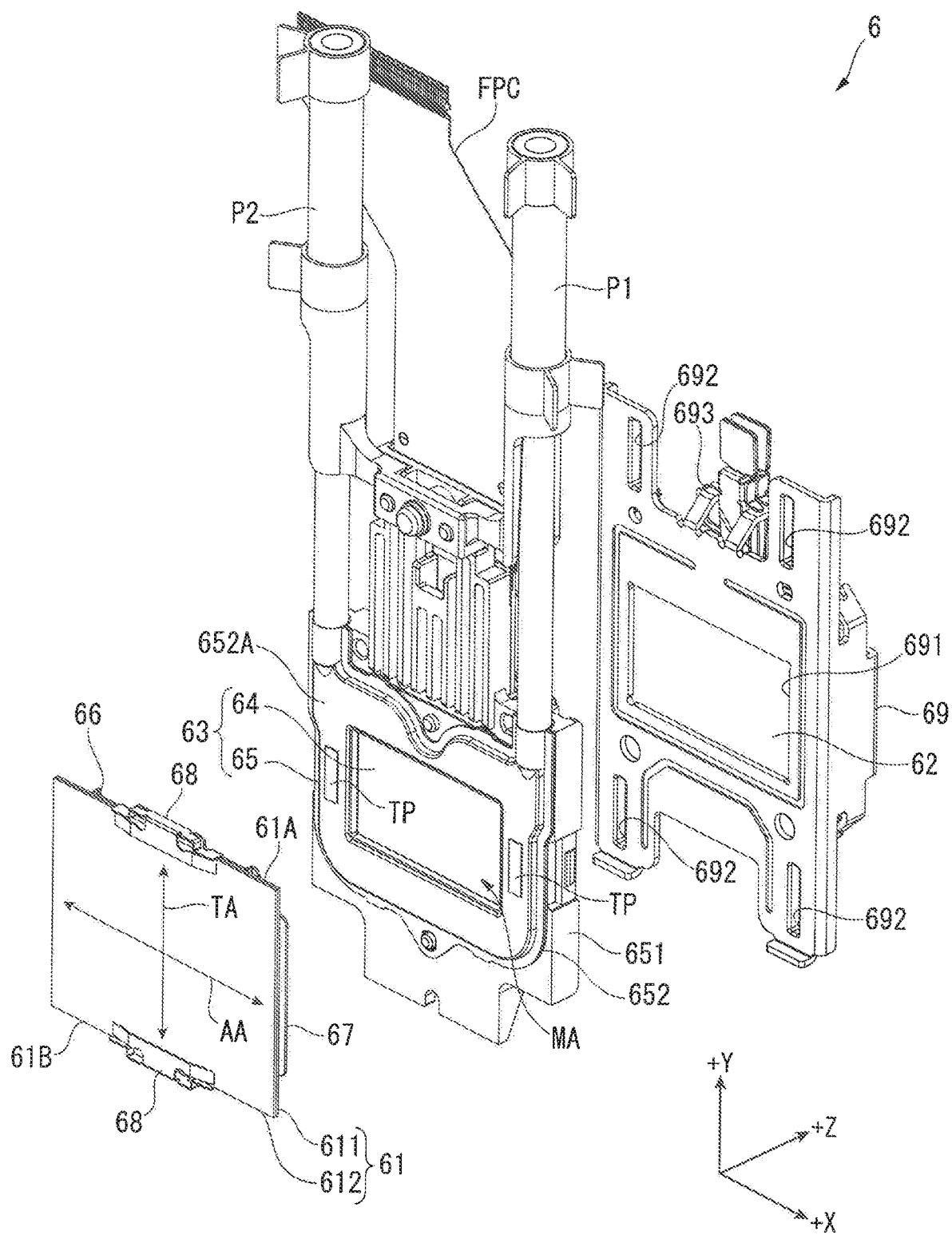
FIG. 6 is an exploded perspective view of a light modulation device in the first embodiment described above viewed from the light incidence side.

FIG. 6 is an exploded perspective view of the light modulation device 6 viewed from the light entrance side.

The light modulation devices 6 are each provided with an incident side attachment member 66 and an emission side attachment member 69 as shown in FIG. 6 in addition to the incident side polarization plate 61, the emission side polarization plate 62 and the liquid crystal panel 63 as described above.

In the following description, a proceeding direction of the light passing through the light modulation device 6 is defined as a +Z direction, and two directions crossing the +Z direction and crossing each other are defined as a +X direction and a +Y direction. Among these directions, the +X direction is defined as a longitudinal direction of a modulation area MA having a rectangular shape provided to the liquid crystal panel 63, and the +Y direction is defined as a short-side direction of the modulation area MA. More specifically, in the view from a position opposed to the liquid crystal panel 63, the +Y direction is defined as an upward direction parallel to the short-side direction, and the +X direction is defined as a rightward direction parallel to the longitudinal direction. Further, although not shown in the drawings, an opposite direction to the +Z direction is defined as a −Z direction. The same applies to a −X direction and a −Y direction. As described above, the +Z direction, the +X direction and the +Y direction are directions defined for each of the light modulation devices 6.

It should be noted that in the present embodiment, the +Z direction, the +X direction and the +Y direction are defined as directions perpendicular to each other.

Configuration of Emission Side Polarization Plate and Emission Side Attachment Member Here, the emission side polarization plate 62 and the emission side attachment member 69 will be described in advance.

The emission side polarization plate 62 is a wire-grid polarization element, and is disposed on the light emission side with respect to the liquid crystal panel 63 as described above. The emission side polarization plate 62 transmits the light of a polarization component along the transmission axis of the emission side polarization plate 62 out of the light entering the emission side polarization plate 62 from the liquid crystal panel 63, and absorbs the light of a polarization component along the absorption axis perpendicular to the transmission axis in the plane.

The emission side attachment member 69 holds the emission side polarization plate 62, and at the same time, is attached to a surface on the light emission side (the +Z direction side) in the liquid crystal panel 63. The emission side attachment member 69 is a metal member formed to have a roughly H-shape viewed from the light incidence side (the −Z direction side). Such an emission side attachment member 69 has an opening part 691, hole parts 692, and a holding part 693.

The opening part 691 is an opening part having a rectangular shape which is located in a roughly central area in the emission side attachment member 69, and through which the light having passed through the liquid crystal panel 63 passes.

The hole parts 692 are respectively provided to the four corner parts of the emission side attachment member 69. In these hole parts 692, there are respectively inserted insertion parts 4752 of the holding member 475 described above.

The holding part 693 is located on the light emission side in the emission side attachment member 69, and holds the emission side polarization plate 62. It should be noted that he holding part 693 is configured so as to be able to also hold an optical compensating plate (a view angle compensating plate), and the holding part 693 is capable of adjusting the tilt of the optical compensating plate toward the ±Z directions with respect to the X-Y plane.

Configuration of Liquid Crystal Panel

As shown in FIG. 6, the liquid crystal panel 63 has a panel main body 64 and a frame 65.

The panel main body 64 modulates the colored light beam entering the panel main body 64 via the incident side polarization plate 61 in accordance with the image information (including an image signal) input from the control device described above via a flexible printed circuit board FPC. Although the detailed illustration is omitted, the panel main body 64 has a structure that liquid crystal molecules are encapsulated between a pair of substrates, and the area where the liquid crystal molecules are encapsulated is the modulation area MA capable of modulating the colored light beam, and is the image forming area for forming the image. Such a modulation area MA is formed to have a rectangular shape viewed from a position opposed to the modulation area MA.

The frame 65 is a housing made of metal for surrounding and holding the panel main body 64. The frame 65 has a frame main body 651 surrounding lateral sides (the ±X direction sides and the ±Y direction sides) of the panel main body 64 and covering a part of the light emission side (the +Z direction side) of the panel main body 64, and a cover member 652 attached to the frame main body 651 so as to cover a part of the panel main body 64 from the light incidence side.

Figure 7:
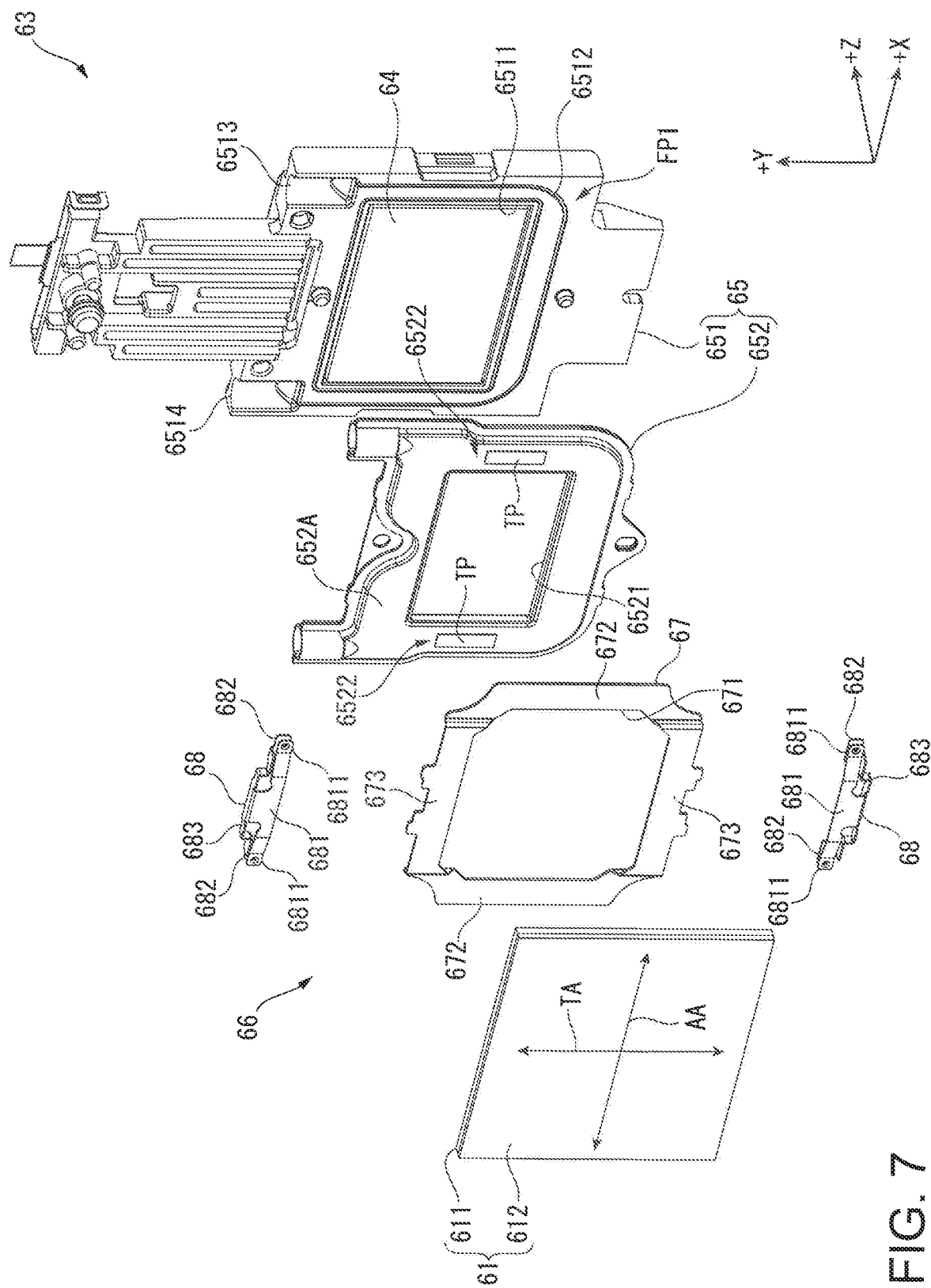
FIG. 7 is an exploded perspective view of an incident side polarization plate, an incident side attachment member and a liquid crystal panel in the first embodiment described above viewed from the light incidence side.

FIG. 7 is an exploded perspective view of the incident side polarization plate 61 and the incident side attachment member 66, and the liquid crystal panel 63 viewed from the light incidence side.

As shown in FIG. 7, the frame main body 651 has a placement part 6511 having a rectangular recessed shape in which the panel main body 64 is placed, and in addition has a groove part 6512 formed along the peripheral edge of the placement part 6511.

The groove part 6512 is formed to have a roughly U-shape extending along the long side on the −Y direction side cut of the pair of long sides, and the pair of short sides in the modulation area MA having a rectangular shape of the panel main body 64 placed in the placement part 6511. In the case in which the cover member 652 is attached to the frame main body 651, the groove part 6512 forms a flow channel FP1 through which the second refrigerant RE2 described above flows.

Further, the frame main body 651 has connection parts 6513, 6514 to be connected to the pipes P1, P2 described above on both ends in the +X direction on the +Y direction side.

Specifically, the connection part 6513 located on the +X direction side is connected to the pipe P1 described above, and the connection part 6514 located on the −X direction side is connected to the pipe P2 described above. Further, the second refrigerant RE2 having flowed through the pipe P1 flows through the flow channel FP1 having a roughly U-shape via the connection part 6513, and is then discharged to the pipe P2 via the connection part 6514.

The cover member 652 is combined with the frame main body 651 to form the flow channel FP1 described above. To the frame surface 652A on the light incidence side of the cover member 652, there is attached a support member 67 of the incident side attachment member 66.

It should be noted that the cover member 652 is provided with an opening part 6521 having a rectangular shape for making the colored light beam having passed through the incident side polarization plate 61 enter the panel main body 64 placed inside the frame 65. Therefore, the support member 67 is attached to a position except the opening part 6521 in the frame surface 652A. Specifically, areas on the +X direction side and the −X direction side with respect to the opening part 6521 are defined as connection areas 6522 with the support member 67 in the frame surface 652A, and in the connection areas 6522, there are disposed tapes TP to which the support member 67 adheres.

Configuration of Incident Side Polarization Plate

As shown in FIG. 6 and FIG. 7, the incident side polarization plate 61 has a polarization plate main body 611 and a light transmissive substrate 512.

The polarization plane main body 611 is a wire-grid polarization element having a grid structure in which a plurality of linear wires is arranged in a plane. The polarization plate main body 611 transmits the light of a polarization component along the transmission axis TA of the polarization plate main body 611 out of the light entering the polarization plate main body 611, and absorbs the light of a polarization component along the absorption axis AA perpendicular to the transmission axis TA in the plane. In the polarization plate main body 621 as the wire-grid polarization element, the transmission axis TA is an axis perpendicular to the extending direction of the wire described above, and the absorption axis AA is an axis along the extending direction of the wire.

It should be noted that in the present embodiment, since the retardation elements 473 described above are disposed on the light emission side of the respective light modulation devices 6B, 6R, the polarized light beams having the same polarization direction respectively enter the light modulation devices 6B, 6G, and 6R. Therefore, the extending direction of the transmission axis TA of the polarization plate main body 611 provided to each of the light modulation devices 6B, 6G, and 6R is the same between the light modulation devices 6B, 6G, and 6R, and in the present embodiment, the transmission axis TA is defined as a direction parallel to the +Y direction.

The light transmissive substrate 612 is disposed on the light incidence side with respect to the polarization plate main body 611. Specifically, the light transmissive substrate 612 is disposed so as to cover the polarization plate main body 611 viewed from the light incidence side, and the surface on the light emission side in the light transmissive substrate 612 has surface contact with the surface on the light incidence side in the polarization plate main body 611. The light transmissive substrate 612 radiates the heat transferred from the polarization plate main body 611 to thereby cool the polarization plate main body 611. As such a light transmissive substrate 612, there can be cited a sapphire substrate relatively high in light transmissive property and thermal conductivity.

Configuration of Incident Side Attachment Member

Figure 8:
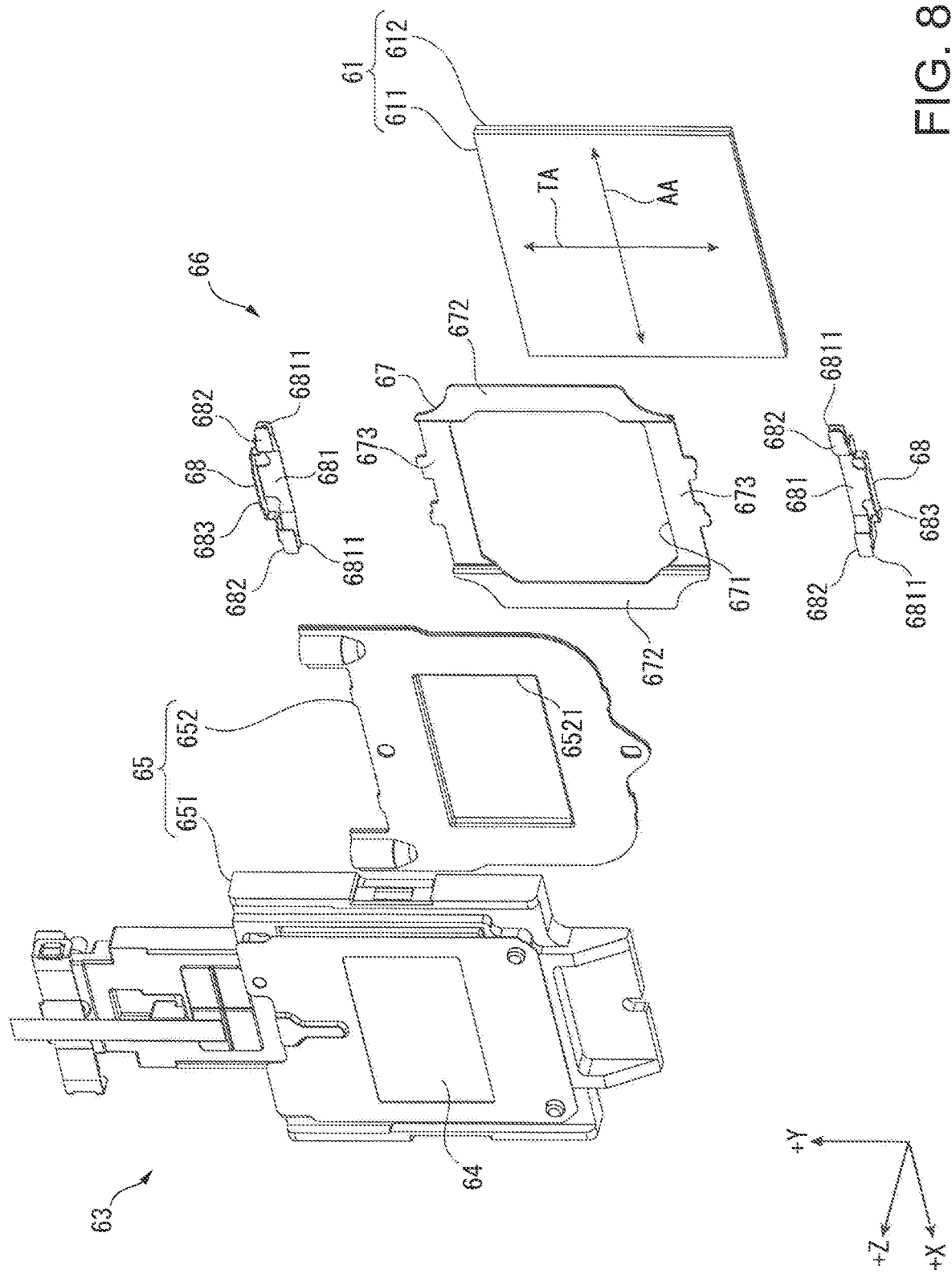
FIG. 8 is an exploded perspective view of the incident side polarization plate, the incident side attachment member and the liquid crystal panel in the first embodiment described above viewed from a light emission side.

FIG. 8 is an exploded perspective view of the incident side polarization plate 61 and the incident side attachment member 66, and the liquid crystal panel 63 viewed from the light emission side. Further, FIG. 9 is a perspective view of the incident side polarization plate 61 and the incident side attachment member 66 viewed from the light emission side.

The incident side attachment member 66 is for holding the incident side polarization plate 61 and attaching the incident side polarization plate 61 to the liquid crystal panel 63 (the cover member 652), and corresponds to an attachment member according to the invention. As shown in FIG. 6 through FIG. 9, the incident side attachment member 66 is configured including a support member 67 to be attached to the liquid crystal panel 63, and a pair of clamp-holding members 68.

Configuration of Support Member

Figure 9:
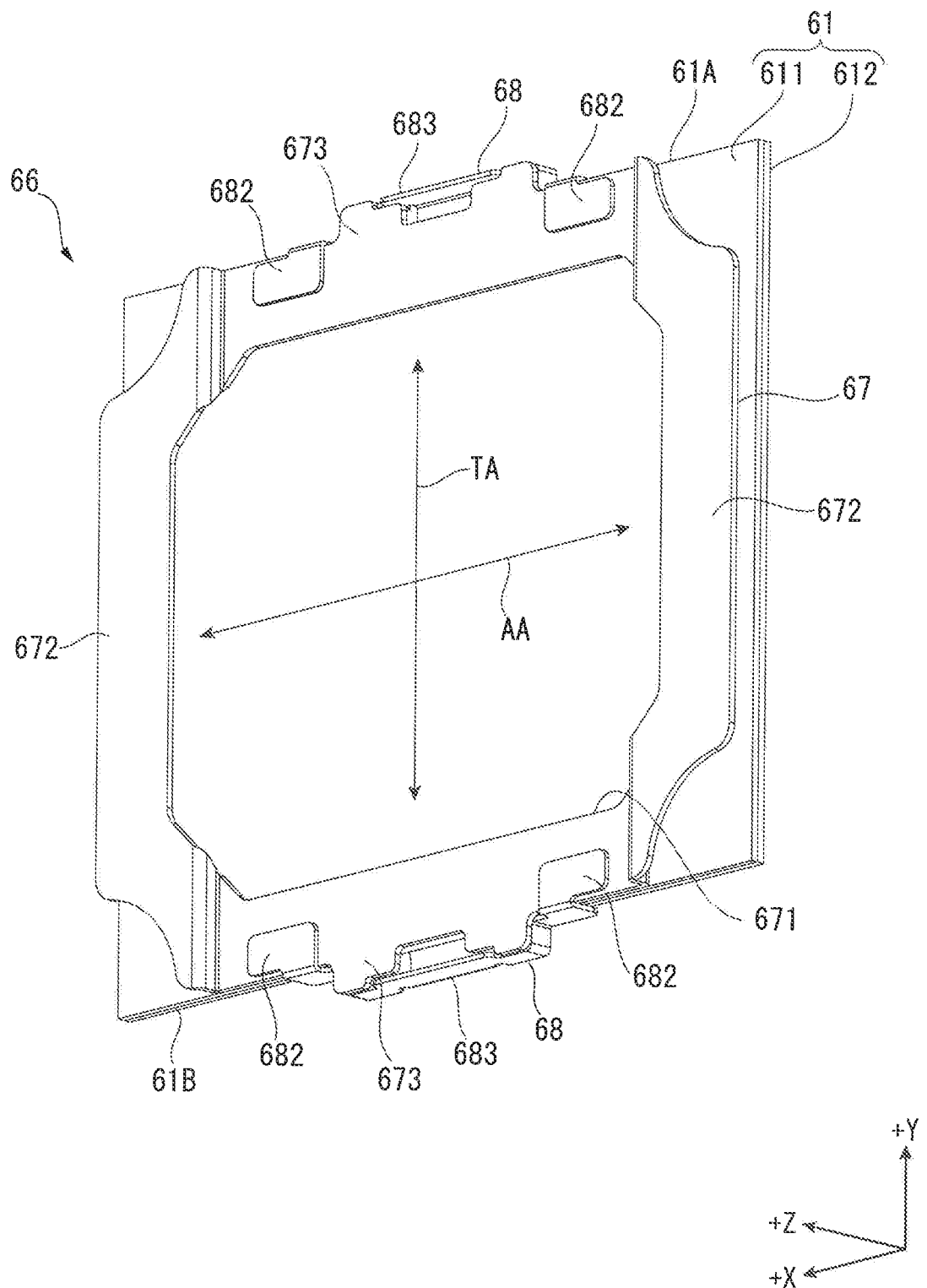
FIG. 9 is a perspective view showing the incident side polarization plate and the incident side attachment member in the first embodiment described above.

As shown in FIG. 8 and FIG. 9, the support member 67 is a metal member formed to have a roughly rectangular frame shape, and is formed by performing bending work on a metal plate. The support member 67 has an opening part 671 having a rectangular shape located at the center, a pair of connection parts 672 located on the ±X direction sides, and a pair of clamp-held parts 673 located on the ±Y direction sides.

The opening part 671 is an opening part through which the colored light beam having passed through the incident side polarization plate 61 passes.

The pair of connection parts 672 are each formed to have a plate-like shape parallel to the X-Y plane. These connection parts 672 are attached to the connection areas 6522 of the cover member 652 described above with the tapes TP described above. In other words, the support member 67 is connected to the cover member 652 (the frame 65) at positions corresponding to the pair of short sides of the modulation area MA described above.

The pair of clamp-held parts 673 are located on the light incidence side (the −Z direction side) with respect to the pair of connection parts 672, and are each formed to have a plate-like shape parallel to the X-Y plane. Each of these clamp-held parts 673 are each held by corresponding one of the pair of clamp-holding parts 68 along the +Z direction together with the incident side polarization plate 61.

As described above, in the support member 67, the direction (±Z directions) in which the pair of connection parts 672 are opposed to each other, and the direction (±Y directions) in which the pair of clamp-held parts 673 are opposed to each other cross (are perpendicular to) each other. Therefore, it is possible to make it easy to form a gap in the +Z direction between the X-Y plane in which the pair of connection parts 672 are included and the X-Y plane in which the pair of clamp-held parts 673 are included. Through the gap, the first refrigerant RE1 having been supplied from the blast fan 513 flows. The flow channel of the first refrigerant RE1 will be described later in detail.

Configuration of Clamp-Holding Members

The pair of clamp-holding members 68 hold the incident side polarization plate 61 and the clamp-held parts 673 of the support member 67 described above by clamping to integrate these constituents with each other. Among these constituents, one of the clamp-holding members 68 is disposed along an end edge on the +Y direction side of the incident side polarization plate 61, and the other of the clamp-holding members 68 is disposed along the end edge on the −Y direction side thereof. Specifically, as shown in FIG. 9, these clamp-holding members 68 are respectively disposed on the side surface 61A on the +Y direction side and the side surface 61B (the side surfaces 61A, 61B parallel to the extending direction of the wire described above) on the −Y direction side as the side surfaces crossing the transmission axis TA parallel to the +Y direction out of the side surfaces of the incident side polarization plate 61.

As shown in FIG. 7 and FIG. 8, these clamp-holding members 68 each have first opposed part 681, second opposed parts 682, and a connection part 683. It should be noted that the connection part 683 connects the first opposed part 681 and the second opposed parts 682 to each other.

The first opposed part 681 is located on the light incidence side in the clamp-holding member 68, and the second opposed parts 682 are located on the light emission side. The first opposed part 681 and the second opposed parts 682 are opposed to each other in the +Z direction.

The first opposed part 681 has a pair of pressing parts 6811 disposed at the both ends in the longitudinal direction in the first opposed part 681. These pressing parts 6811 are each formed like a plate spring, and each have contact with the plane of incidence of light of the light transmissive substrate 612 to press the light transmissive substrate 612 toward the +Z direction.

The second opposed parts 682 are located at the both ends on the light emission side of the clamp-holding member 68, and have contact with the surface on the light emission side of the clamp-held part 673 in the support member 67 described above. These second opposed parts 682 are respectively opposed to the pair of pressing parts 6811 described above in the +Z direction, and form parts for receiving the pressing force by the pair of pressing parts 6811.

The incident side polarization plate 61 and the support member 67 are clamp-held by such clamp-holding members 68, and thus, the incident side polarization plate 61 and the incident side attachment member 66 are integrated with each other. It should be noted that in such configuration, the first opposed part 681 (the pressing parts 6811), the light transmissive substrate 612, the polarization plate main body 611, the support member 67 (the clamp-held part 673), and the second opposed parts 682 are disposed in this order from the light incidence side.

Cooling of Polarization Plates

In general, in the polarization plate which absorbs the light of the polarization component along the absorption axis crossing the transmission axis, the heat is apt to be generated due to the light absorbed. On the other hand, the polarization characteristic of the polarization plate is apt to be deteriorated by the heat. Therefore, the polarization plate is required to be effectively cooled.

In the case of the present embodiment, on the same grounds, the polarization plate main body 611 of the incident side polarization plate 61 and the emission side polarization plate 62 are required to be effectively cooled.

As described above, in the present embodiment, part of the heat generated in the polarization plate main body 611 is transferred to the light transmissive substrate 612 having surface contact with the polarization plate main body 611, and is then radiated.

Further, another part of the heat generated in the polarization plate main body 611 is transferred to the support member 67 to be connected to the polarization plate main body 611, and is further transferred to the frame 65 through which the second refrigerant RE2 flows in the liquid crystal panel 63 via the support member 67. Thus, the heat generated in the polarization plate main body 611 is transferred to the second refrigerant RE2, and thus, the polarization plate main body 611 is cooled.

It should be noted that since the heat generated in the panel main body 64 is also transferred to the second refrigerant RE2, the panel main body 64 is also cooled in substantially the same manner.

Figure 10:
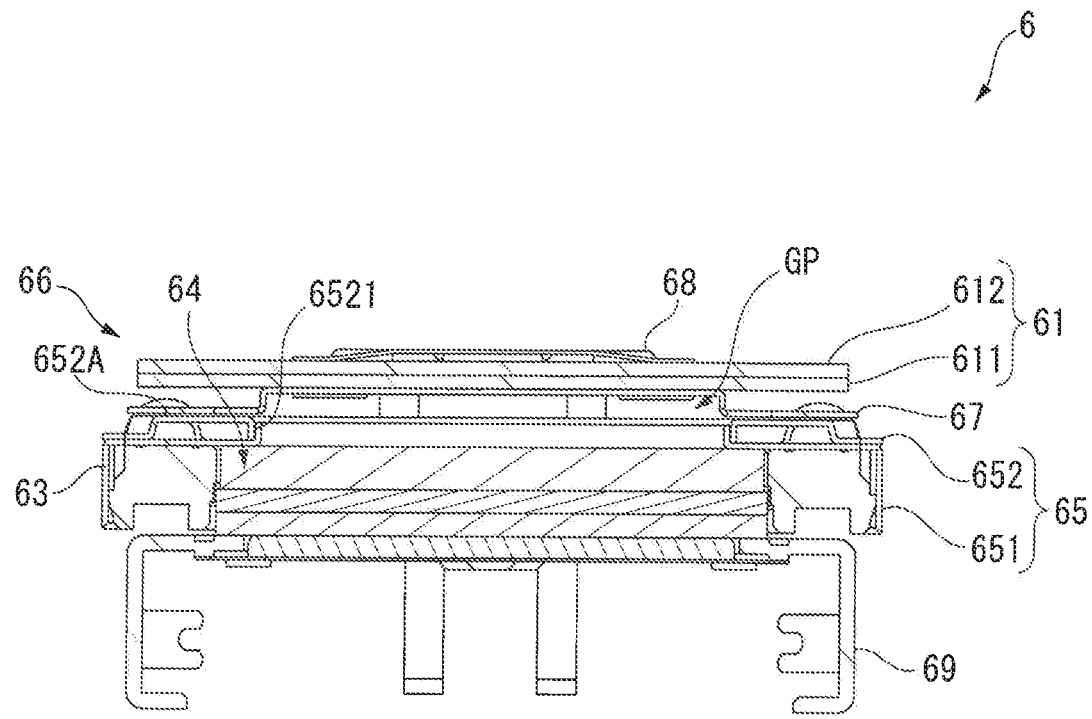
FIG. 10 is a cross-sectional view showing the light modulation device in the first embodiment described above.
Figure 10:
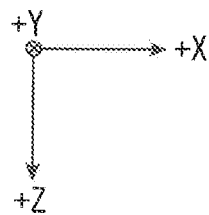
Figure 11:
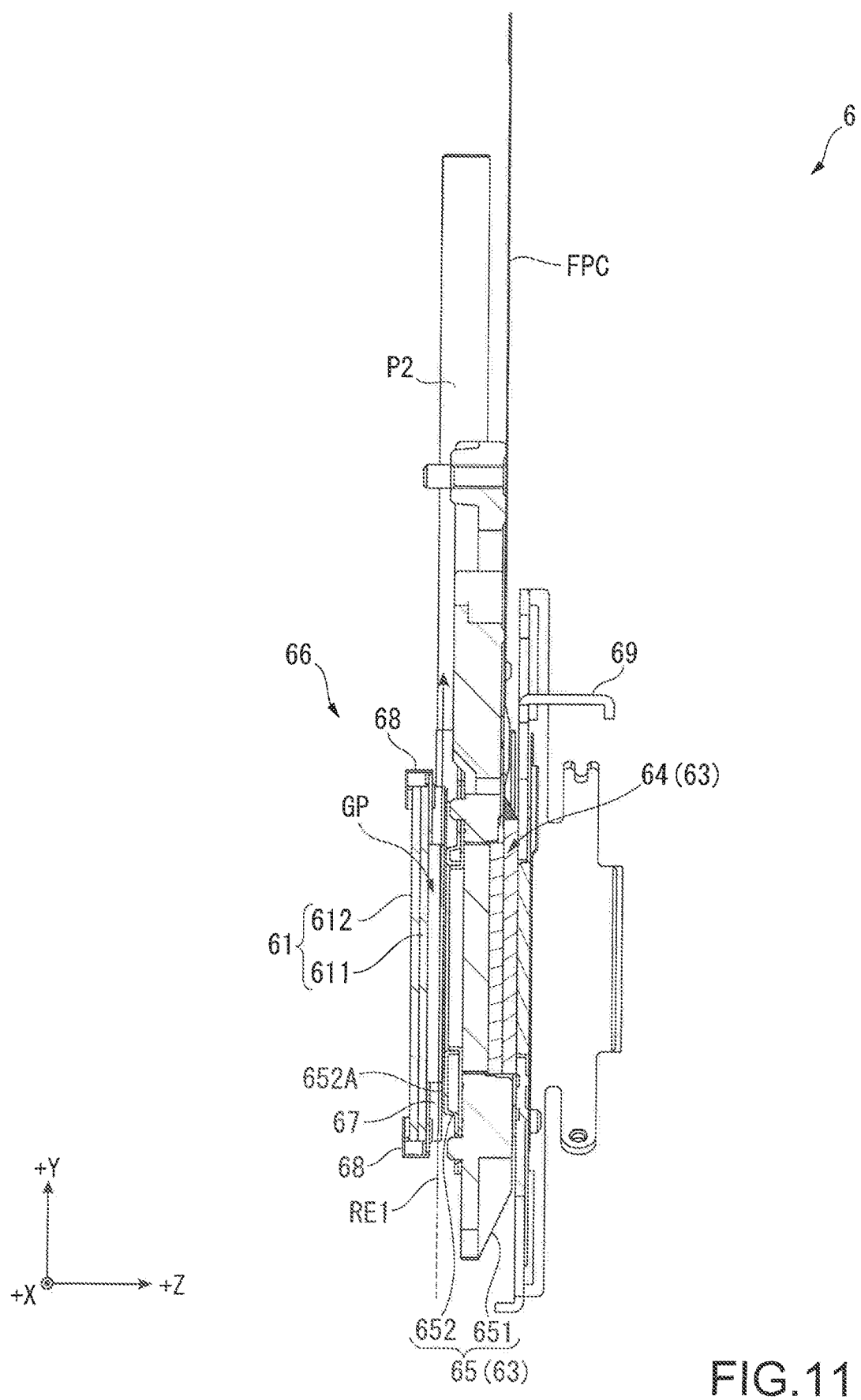
FIG. 11 is a cross-sectional view showing the light modulation device in the first embodiment described above.

FIG. 10 is a cross-sectional view of the light modulation device 6 along the X-Z plane. Further, FIG. 11 is a cross-sectional view of the light modulation device 6 along the Y-Z plane. It should be noted that the illustration of the emission side polarization plate 62 is omitted in FIG. 10 and FIG. 11.

Further, between the frame surface 652A (i.e., the frame surface 652A to which the support member 67 is connected in the frame 65) on the light incidence side of the cover member 652 located light incidence side in the frame 65 described above and the polarization plate main body 611, there is formed a gap GP through which the gaseous refrigerant can flow as shown in FIG. 10. Further, as described above, the incident side polarization plate 61 and the liquid crystal panel 63 are supplied with the first refrigerant RE1 as a gaseous refrigerant from the blast fan 513 described above.

Therefore, as shown in FIG. 11, the first refrigerant RE1 flows through the gap GP between the polarization plate main body 611 and the frame surface 652A in the +Y direction. By transferring the heat of the incident side polarization plate 61 (the polarization plate main body 611) and the heat of the liquid crystal panel 63 (the panel main body 6) to the first refrigerant RE1, the incident side polarization plate 61 and the liquid crystal panel 63 are cooled.

It should be noted that a part of the heat generated in the emission side polarization plate 62 is transferred to the frame 65 via the emission side attachment member 69 made of metal. Thus, the heat is transferred to the second refrigerant RE2 flowing inside the frame 65, and thus, the emission side polarization plate 62 is cooled.

Further, although not shown in the drawings, the first refrigerant RE1 having been fed from the blast fan 514 flows between the liquid crystal panel 63 and the emission side polarization plate 62. By transferring the heat of the emission side polarization plate 62 and the heat of the liquid crystal panel 63 (the panel main body 64) to the first refrigerant RE1, the emission side polarization plate 62 and the liquid crystal panel 63 are cooled.

Positions of Clamp-Holding Members

Figure 12:
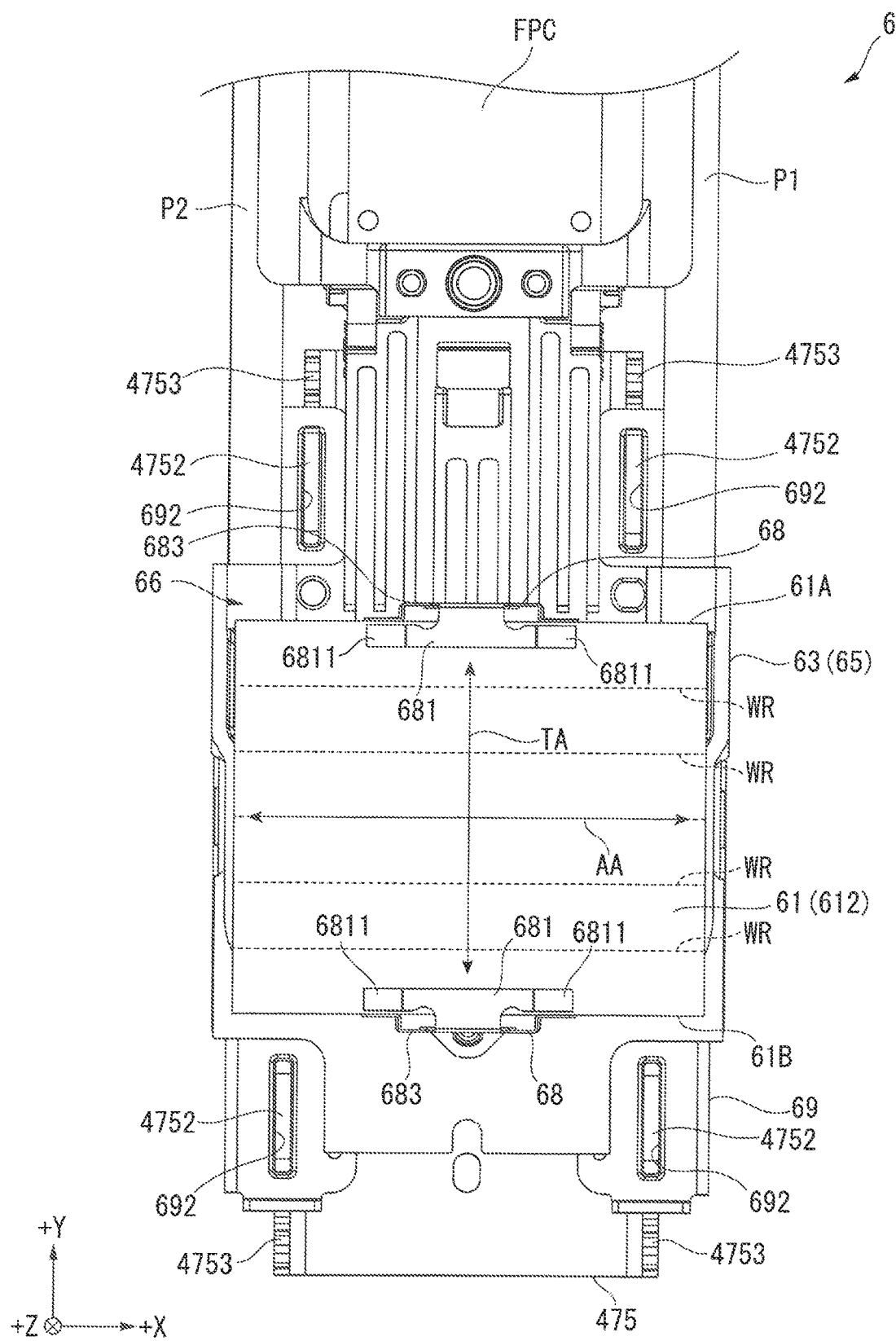
FIG. 12 is a diagram of the light modulation device in the first embodiment described above viewed from the light incidence side.

FIG. 12 is a diagram of the light modulation device 6 viewed from the light incidence side (the −Z direction side), and in other words, a diagram showing a positional relationship between the clamp-holding members 68 and the transmission axis TA of the polarization plate main body 611. It should be noted that in FIG. 12, only some of the wires WR constituting the polarization plate main body 611 of the incident side polarization plate 61 are illustrated.

As described above, the light with the same polarization direction enters each of the light modulation devices 6. Further, in the incident side polarization plate 61, the transmission axis TA is defined as the axis parallel to the +Y direction as shown in FIG. 12. Further, the pair of clamp-holding members 68 described above are disposed in accordance with the side surfaces opposite to each other in the incident side polarization plate 61.

Here, if the incident side polarization plate 61 is pressed toward the +Z direction by the pressing parts 6811 of the clamp-holding members 68, there is a possibility that breakage occurs in the internal structure of the polarization plate main body 611.

In the case in which such breakage occurs, since the polarization main body 611 is the wire-grid polarization element, it is possible for the breakage to spread along the extending direction of the wires WR constituting the wire-grid polarization element. Further, the extending direction of the wires WR is a perpendicular direction to the transmission axis TA.

Therefore, if the clamp-holding members 68 are disposed on the side surfaces (the side surfaces on the ±X direction sides as the side surfaces crossing the wires WR) parallel to the transmission axis TA out of the side surfaces of the incident side polarization plate 61, there is a possibility that the damaged part in the polarization plate main body 611 is located in the transmission area at the light in the polarization plate main body 611 in the case in which the breakage spreads along the wires WR. In such a case, there arises a possibility that the polarization characteristic of the polarization plate main body 611 changes, and thus, the polarized light which should normally be blocked (absorbed) is transmitted.

In contrast, in the present embodiment, the pair of clamp-holding members 68 are disposed on the side surfaces 61A, 61B (the side surfaces 61A, 61B on the ±Y direction sides as the side surfaces along the extending direction of the wires WR) crossing the transmission axis TA of the incident side polarization plate 61. In other words, in the case of viewing the light modulation device 6 from the light incidence side, the pair of clamp-holding members 68 are respectively disposed at the positions corresponding respectively to the pair of long sides in the modulation area MA of the liquid crystal panel 63.

Therefore, even in the case in which the breakage described above occurs, and then spreads along the wires WR, it is possible to prevent the damaged part in the polarization plate main body 611 from being located in the transmission area described above. Therefore, it is possible to maintain the polarization characteristic of the polarization plate main body 611, and it is possible to prevent the reliability of the incident side polarization plate 61, and by extension, the reliability of the light modulation device 6, from deteriorating.

The projector 1 according to the present embodiment has the following advantages.

The liquid crystal panel 63 is provided with the frame 65 having the flow channel FP1 (the first flow channel) inside, the second refrigerant RE2 having been pressure-fed by the pump 55 as the first circulation device flowing through the flow channel FP1. The flow channel FP1 is formed to have a roughly U-shape along one of the pair of long sides and the pair of short sides in the modulation area MA outside the modulation area MA of the panel main body 64. Further, the incident side polarization plate 61 has the polarization plate main body 611 and the light transmissive substrate 612, and the incident side polarization plate 61 is attached to the liquid crystal panel 63 with the incident side attachment member 66 as the attachment member.

Among these constituents, the incident side attachment member 66 has a support member 67 attached to the frame surface 652A on the light incidence side in the frame 65 described above, and the pair of clamp-holding members 68 for holding the incident side polarization plate 61 and the support member 67 by clamping. Further, in the case of viewing the light modulation device 6 from the light incidence side, the clamp-holding members 68 are disposed at respective positions corresponding to the long sides on the ±Y direction sides of the modulation area MA. Further, on the frame surface 652A described above, the support member 67 having the frame-like shape is connected to the connection areas 6522 outside the modulation area MA, and respectively located along the short sides on the ±X direction sides of the modulation area MA.

According to this configuration, a part of the heat generated in the polarization plate main body 611 can be radiated by the light transmissive substrate 612 having surface contact with the polarization plate main body 611 on the light incidence side. Thus, it is possible to cool the polarization plate main body 611.

Further, a part of the heat generated in the polarization plate main body 611 is transferred to the frame 65 via the support member 67. Since the flow channel FP1 inside the frame 65 is formed in such a manner as described above, it is possible to make the second refrigerant RE2 flow through the connection areas 6522 to which the heat is transferred from the support member 67. Thus, the heat of the polarization plate main body 611 having been transferred to the frame 65 can effectively be transferred to the second refrigerant RE2.

Further, the clamp-holding members 68 are disposed outside the modulation area MA and on the ±Y direction sides with respect to the modulation area MA. According to this configuration, since it is possible to make the positions of the clamp-held parts 673 clamp-held by the respective clamp-holding members 68 different from the positions of the connection parts 672 to be connected to the frame 65 in the support member 67, it is possible to make it easy to form the gap GP between the frame 65 and the polarization plate main body 611. It is possible to transfer the heat of the frame 65 and the polarization plate main body 611 to the first refrigerant RE1 as the gaseous refrigerant flowing through the gap GP.

As described above, it is possible to disperse the heat of the polarization plate main body 611, and further efficiently transfer the heat to the first refrigerant RE1 as the gaseous refrigerant and the second refrigerant RE2 as the liquid refrigerant. Therefore, it is possible to efficiently cool the polarization plate main body 611, and by extension, the incident side polarization plate 61.

The polarization plate main body 611 is the wire-grid polarization element. Further, the clamp-holding members 68 are disposed in accordance with the side surfaces 61A, 61B crossing (perpendicular to) the transmission axis TA, namely the side surfaces 61A, 61B parallel to the extending direction of the wires WR, out of the side surfaces of the incident side polarization plate 61. According to this configuration, as described above, even in the case in which the breakage occurs in the polarization plate main body 611 due to the pressing force by the clamp-holding members 68 and the breakage spreads along the wires WR, it is possible to prevent the damaged part from being located in the transmission area of the light in the polarization plate main body 611. Therefore, it is possible to prevent the reliability of the incident side polarization plate 61, and the extension, the reliability of the projector 1, from deteriorating.

Between the light modulation devices 6B, 6R as the second and third light modulation devices, and the light combining device 474, there are disposed the retardation elements 473. According to this configuration, it is possible to make the blue light and the red light (the second light beam and the third light beam) reflected by the light combining device 474 be the light (the light having the polarization direction hard to cause the loss when reflected) having the polarization direction suitable for the reflection by the light combining device 474. Further, it is possible to make the green light (the first light beam) to be combined with the blue light and the red light be the light (the light having the polarization direction hard to cause the loss when transmitted) having the polarization direction suitable for the transmission by the light combining device 474. Therefore, it is possible to prevent the loss of the blue light LB, the green light LG, and the red light LR from occurring in the light combining device 474.

The retardation elements 473 are disposed on the light emission side of the light modulation devices 6B, 6R, respectively. According to the configuration, it is possible to make the colored light beams the same in polarization direction although different in wavelength enter the respective light modulation devices 6B, 6G, and 6R. Therefore, it is possible to uniform the arrangement of the support member 67 and the clamp-holding members 68 between the light modulation devices 6B, 6G, and 6R. Therefore, it is possible to simplify the configuration of the projector 1.

The cooling device 5 has the blast fan 513 as the second circulation device, and the first refrigerant RE1 having been fed from the blast fan 513 flows between the incident side polarization plate 61 (the polarization plate main body 611) and the liquid crystal panel 63 (the frame 65) in the +Y direction as a direction from one of the long sides toward the other thereof in the modulation area MA. According to this configuration, it is possible to surely transfer the heat generated in each of the incident side polarization plates 61 and the liquid crystal panels 63 not only to the second refrigerant RE2 but also to the first refrigerant RE1 as the gaseous refrigerant. Therefore, it is possible to more effectively cool the incident side polarization plates 61 and the liquid crystal panels 63.

It should be noted that the first refrigerant RE1 flowing from the blast fan 513 can also flow toward the +Y direction. Also in this case, substantially the same advantages as described above can be obtained.

Second Embodiment

Then, a second embodiment of the invention will be described.

The projector according to the present embodiment is provided with substantially the same configuration as that of the projector 1 shown in the first embodiment described above, but is different from the projector 1 in the point that the positions of the retardation elements are different, the point that another flow channel is provided to the frame in addition to the flow channel FP1 through which the liquid refrigerant flows, and the point that the orientations of the support member 67 and the clamp-holding member 68 are different. It should be noted that in the description below, a part which is the same or substantially the same as the part having already been described is denoted by the same reference symbol, and the description thereof will be omitted.

Figure 13:
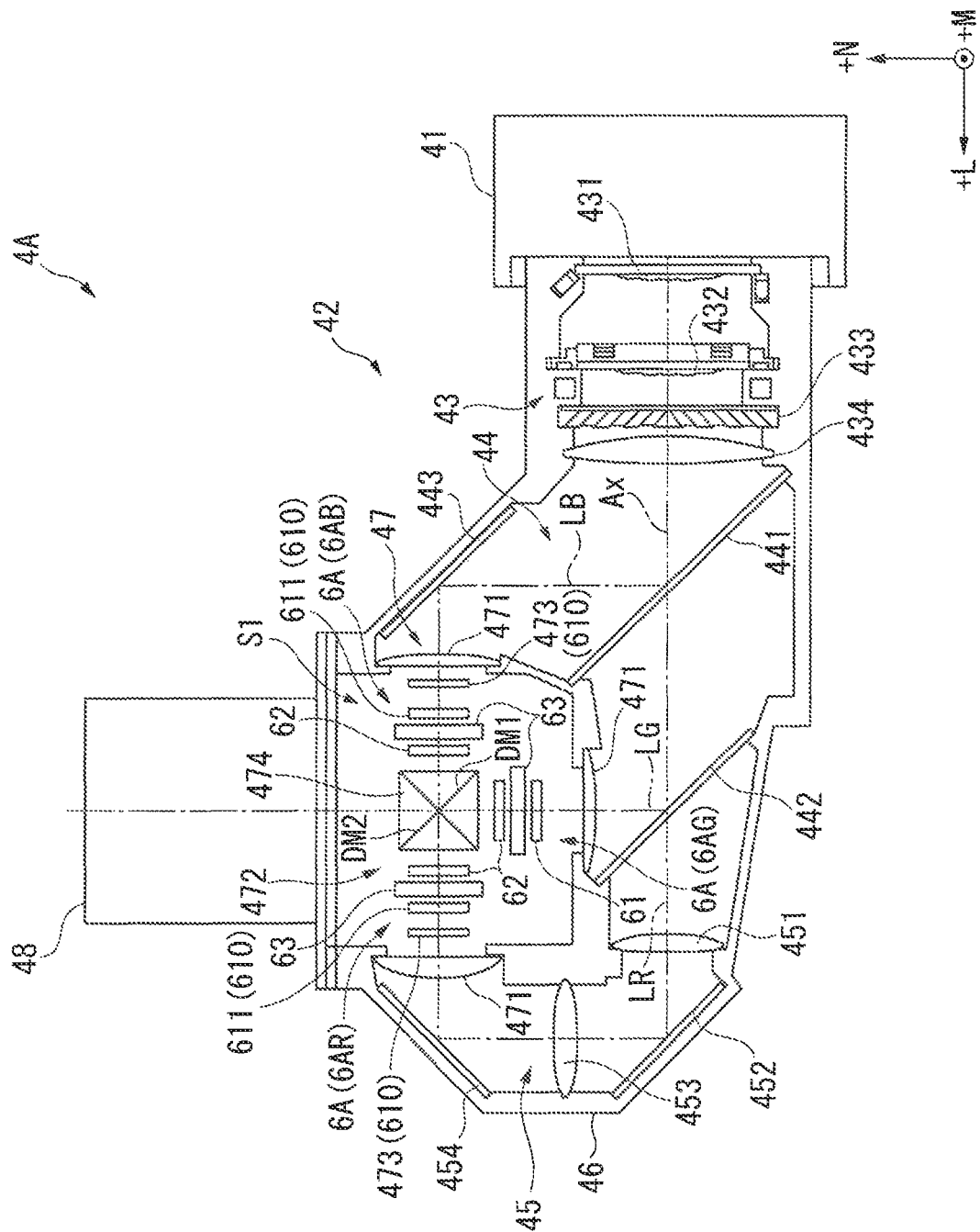
FIG. 13 is a schematic diagram showing a configuration of an image projection device provided to a projector according to a second embodiment of the invention.

FIG. 13 is a schematic diagram showing an image projection device 4A provided to the projector according to the present embodiment.

The projector according to the present embodiment has substantially the same configuration and functions as those of the projector 1 described above except the point that the image projection device 4A is provided instead of the image projection device 4.

As shown in FIG. 13, the image projection device 4A has substantially the same configuration and functions as those of the image projection device 4 described above except the point that light modulation devices 6A (the light modulation devices for red, green and blue are denoted by 6AR, 6AG, and 6AB, respectively) are provided instead of the light modulation devices 6, and the arrangement positions of the retardation elements 473 are different.

In the image projection device 4A, the retardation elements 473 are located on the respective light paths of the blue light LB and the red light LR, and on the light incidence side with respect to the polarization plate main body 611 of the corresponding light modulation devices 6AB, 6AR. In the detailed description, the retardation element 473 disposed on the light path of the blue light LB is disposed between the field lens 471 and the polarization plate main body 611 of the light modulation device 6AB, and the retardation element 473 disposed on the light path of the red light LR is disposed between the field lens 471 and the polarization plate main body 611 of the light modulation device 6AR.

The retardation elements 473 disposed on the light paths of the blue light LB and the red light LR are adopted instead of the light transmissive substrate 612 of the incident side polarization plate 61. Specifically, in the present embodiment, the light modulation devices 6AB, 6AR each have an incident side polarization plate 610 instead of the incident side polarization plate 61, and the incident side polarization plate 610 has the polarization plate main body 611, and the retardation element 473 located on the light incidence side with respect to the polarization plate main body 611, and having contact with the polarization plate main body 611. Further, the retardation element 473 has the light transmissive substrate provided with a function of radiating the heat having been transferred from the polarization plate main body 611, and a retardation layer located on the light transmissive substrate. Therefore, the retardation element 473 also functions as a light transmissive substrate according to the invention. As such a light transmissive substrate, there can be cited a sapphire substrate similarly to the light transmissive substrate 612 described above.

It should be noted that regarding the light modulation device 6AG, similarly to the light modulation device 6G, there is provided the incident side polarization plate 61 having the polarization plate main body 611 and the light transmissive substrate 612.

Such a retardation element 473 is located on the light incidence side with respect to the polarization plate main body 611 in each of the light modulation devices 6AB, 6AR. Therefore, the polarization direction of the green light LG entering the polarization plate main body 611 of the light modulation device 6AG, and the polarization direction of the blue light LB and the red light LR entering the respective polarization plate main bodies 611 of the light modulation devices 6AB, 6AR are different from each other. Further, in accordance therewith, the polarization plate main body 611 in which the transmission axis TA is parallel to the +Y direction, and the extending direction of the wires WR is parallel to the +X direction is adopted as the incident side polarization plate 61 provided to the light modulation device 6AG similarly to the light modulation device 6G described above on the one hand, and the polarization plate main body 611 in which the transmission axis TA is parallel to the +X direction, and the extending direction of the wires WR is parallel to the +Y direction is adopted as the incident side polarization plate 61 provided to each of the light modulation devices 6AB, 6AR.

Figure 14:
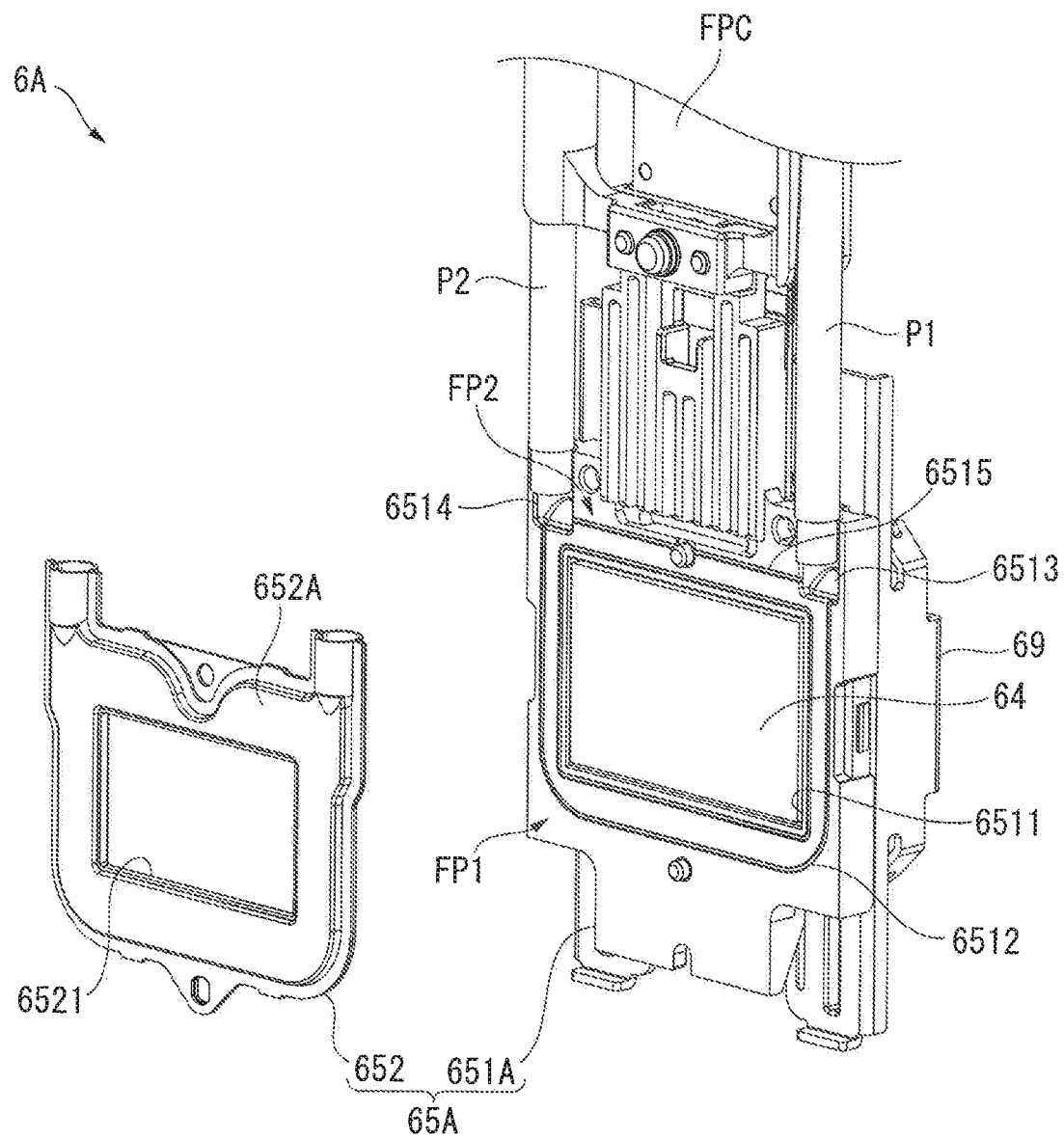
FIG. 14 is a perspective view of a light modulation device in the state in which a cover member is detached from a frame main body in the second embodiment described above viewed from the light incidence side.

FIG. 14 is a perspective view of the light modulation device 6A in the state in which the cover member 652 is detached from the frame main body 651A viewed from the light incidence side. It should be noted that the illustration of the incident side polarization plate 61 and the incident side attachment member 66 is omitted in FIG. 14.

The light modulation device 6A has substantially the same configuration as the light modulation device 6 except the point that a frame 65A is provided instead of the frame 65. In contrast, as described above, the light modulation device 6AG has the incident side polarization plate 61 while the light modulation devices 6AB, 6AR each have the incident side polarization plate 610. Further, the orientations of the support member 67 and the clamp-holding members 68 constituting the incident side attachment member 66 are different between the light modulation device 6AG and the light modulation dances 6AB, 6AR. This point will be described later in detail.

Similarly to the frame 65, the frame 65A is a housing made of metal for surrounding and holding the panel main body 64. As shown in FIG. 14, the frame 65A has a frame main body 651A and the cover member 652, wherein the frame main body 651A surrounds the lateral side of the panel main body 64, and at the same time covers a part on the light emission side of the panel main body 64.

The frame main body 651A has the placement part 6511, and the groove part 6512 and the connection parts 6513, 6514 for forming the flow channel FP1 similarly to the frame main body 651, and in addition has a groove part 6515.

The groove part 6515 is formed outside the modulation area MA, and so as to extend along the long side on the +Y direction side out of the pair of long sides of the modulation area MA. In the detailed description, the groove part 6515 is formed along the +X direction as the extending direction of the long side located on the +Y direction side so as to communicate the connection parts 6513, 6514 with each other. When the cover member 652 is attached to the frame main body 651A, such a groove part 6515 forms a flow channel FP2 (a second flow channel) in which the second refrigerant RE2 having flowed into the connection part 6513 partially flows toward the connection part 6514.

Here, the polarization direction of the green light LG entering the polarization plate main body 611 of the light modulation device 6AG out of the light modulation devices 6AB, 6AG, and 6AR is the same as the polarization direction of the green light LG entering the light modulation device 6G described above. Therefore, the positions of the clamp-holding members 68 and the orientation of the support member 67 in the light modulation device 6AG are the same as the positions of the clamp-holding members 68 and the orientation of the support member 67 in the light modulation device 6G described above.

Figure 15:
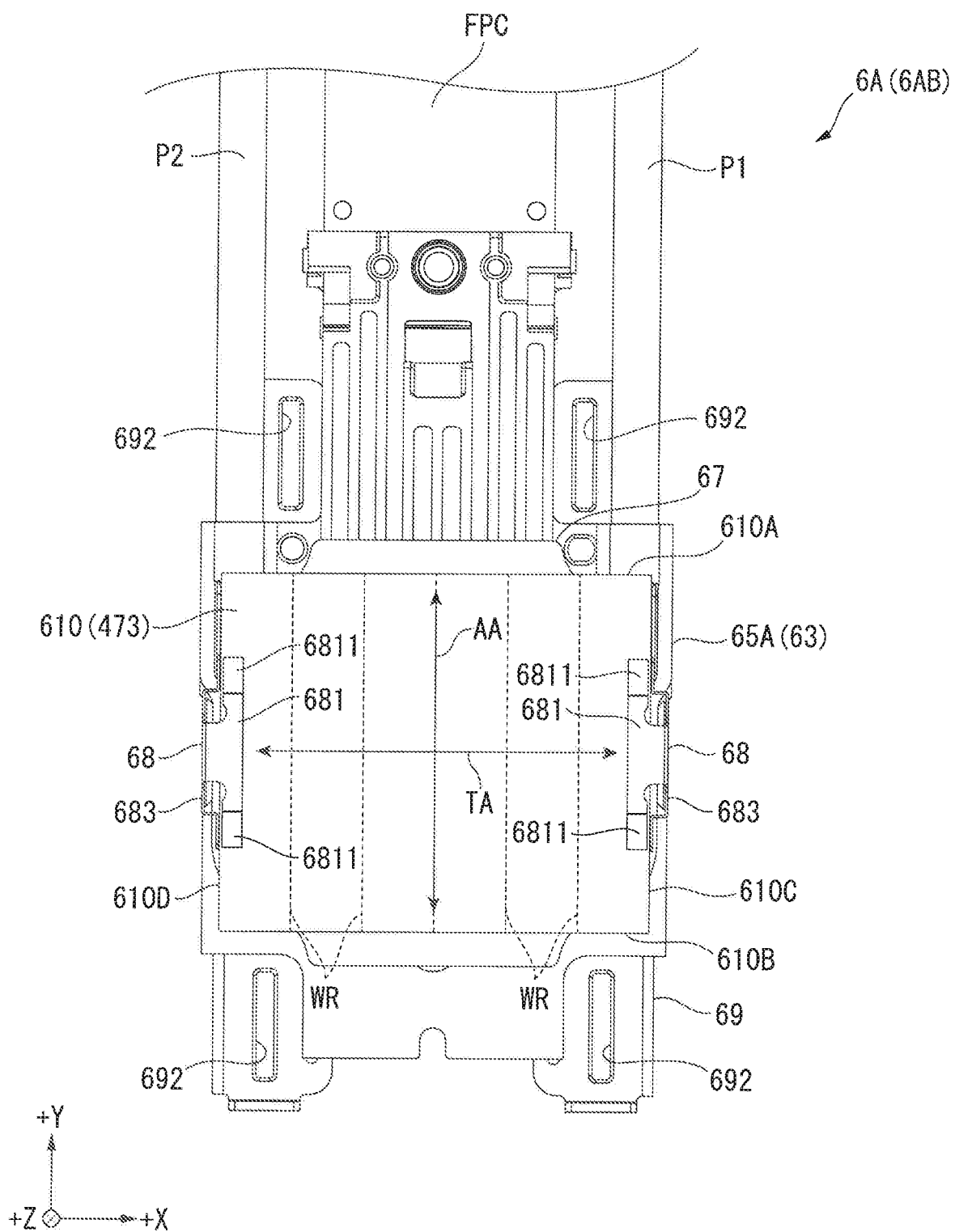
FIG. 15 is a diagram of the light modulation device in the second embodiment described above viewed from the light incidence side.

FIG. 15 is a diagram of the light modulation device 6AB viewed from the light entrance side. In other words, FIG. 15 is a diagram showing the positions of the clamp-holding members 68 in the light modulation device 6AB.

In contrast, the polarization directions of the blue light LB and the red light LR respectively entering the polarization plate main bodies 611 of the light modulation devices 6AB, 6AR are different from the polarization directions of the blue light LB and the red light LR respectively entering the light modulation devices 6B, 6R described above since the retardation elements 473 are located on the light incidence side of the polarization plate main bodies 611. According to this fact, as described above, in the light modulation devices 6AB, 6AR, the transmission axis TA of the incident side polarization plate 61 is set to an axis parallel to the +X direction.

Therefore, in the light modulation device 6AB, for example, as shown in FIG. 15, in the case of viewing the light modulation device 6AB from the light incidence side, the clamp-holding members 68 are disposed at positions corresponding to the pair of short sides in the modulation area MA of the liquid crystal panel 63. Specifically, the clamp-holding members 68 are disposed on the respective side surfaces 610C, 610D (the side surfaces 610C, 610D parallel to the extending direction of the wires WR) crossing the transmission axis TA instead of the side surfaces 610A, 610B out of the side surfaces of the incident side polarization plate 610. According to this configuration, similarly to the case in the light modulation devices 6 described above, even in the case in which the breakage occurs in the polarization plate main body 611 due to the pressing force by the pressing part 6811 of the clamp-holding member 68 and the breakage spreads along the wires WR, the breakage is prevented from being located in the transmission area of the light in the polarization plate main body 611.

It should be noted that although not shown in the drawings, since the clamp-holding members 68 are disposed on the side surfaces 610C, 610D, the support member 67 is disposed so that the pair of clamp-held parts 673 are opposed to each other in the +X direction, and the pair of connection parts 672 are opposed to each other in the +Y direction. In other words, in the case of viewing the light modulation device 6AB from the light incidence side, the pair of connection parts 672 are disposed at the positions corresponding respectively to the pair of long sides in the modulation area MA of the liquid crystal panel 63. In other words, the support member 67 in the light modulation device 6AB has an orientation rotated 90° around the +Z direction with respect to the support member 67 in the light modulation device 6.

In the support member 67 having such an arrangement, the connection sections 672 are connected to areas (areas corresponding to the respective long sides of the modulation area MA) outside the modulation area MA and on the ±Y direction sides with respect to the modulation area MA in the frame surface 652A of the cover member 652 as a surface on the light incidence side of the frame 65A.

Among these areas, through the area on the −Y direction side, the second refrigerant RE2 flowing through the flow channel FP1 described above flows, and through the area on the +Y direction side, the second refrigerant RE2 flowing through the flow channel FP2 described above flows.

Therefore, also in the light modulation device 6AB, it is possible to make the second refrigerant RE2 flow through each of the areas to which the heat is transferred from the support member 67 in the frame 65A, and it is possible to efficiently transfer the heat to the second refrigerant RE2.

Further, also in the support member 67 having the orientation rotated as described above, since the connection parts 672 and the clamp-held parts 673 are separated from each other in the +Z, direction, the gap GP is formed between the polarization plate main body 611 and the frame surface 652A of the cover member 652. Therefore, the first refrigerant RE1 flowing due to the blast fan 513 flows through the gap GP toward the +Y direction. By transferring the heat of the polarization plate main body 611 and the heat of the liquid crystal panel 63 to the first refrigerant RE1, the incident side polarization pate 61 (the polarization plate main body 611) and the liquid crystal panel 63 (the panel main body 64) are cooled.

It should be noted that since the light modulation device 6AR has substantially the same configuration as that of the light modulation device 6AB, the description of the light modulation device 6AR will be omitted.

According to the projector related to the present embodiment described hereinabove, in addition to the advantages substantially the same as those of the projector 1 described above, the following advantages can be obtained.

The frame 65A has the flow channel FP2 which is disposed outside the modulation area MA, and along the long side located on the +Y direction side out of the pair of long sides of the modulation area MA, and through which the second refrigerant RE2 having flowed into the connection part 6513 partially flows in addition to the flow channel FP1 described above. According to this configuration, it is possible to increase the contact area between the heat having been transferred to the frame 65A and the second refrigerant RE2. Therefore, the heat of the panel main body 64 transferred to the frame 65A, and the heat of the polarization plate main body 611 to be transferred to the frame 65A via the support member 67 can efficiently be transferred to the second refrigerant RE2, and thus, it is possible to efficiently cool the panel main body 64 and the polarization plate main body 611.

In particular, in the light modulation devices 6AB, 6AR, the connection parts 672 of the support member 67 are connected to the areas located outside the modulation area MA and on the ±Y direction sides with respect to the modulation area MA on the frame surface 652A of the frame 65A. Therefore, in the case in which the support member 67 is connected to the frame 65A as described above, the heat of the polarization plate main body 611 transferred to the frame 65A via the support member 67 can effectively be transferred to the second refrigerant RE2 flowing through the flow channels FP1, FP2.

The retardation elements 473 are disposed on the light incidence side of the respective light modulation devices 6AB, 6AR as the second and third light modulation devices in the respective light paths of the blue light LB and the red light LA as the second light beam and the third light beam. Further, in the light modulation device 6AG as the first light modulation device, the arrangement of the support member 67 and the clamp-holding members 68 is substantially the same as that of the light modulation device 6G. Further, in the light modulation devices 6AB, 6AR, in the case of viewing these from the light incidence side, the clamp-holding member 68 are disposed at the positions corresponding to the short sides on the ±X direction sides of the modulation area MA, and the support member 67 is connected at the areas outside the modulation area MA and along the long sides on the ±Y direction sides of the modulation area MA on the frame surface 652A on the light incidence side in the frame 65A.

According to this configuration, in the light modulation device 6AG, the clamp-holding members 68 can be disposed on the side surfaces (the side surfaces along the extending direction of the wires WR) crossing the transmission axis TA of the polarization plate main body 611 out of the side surfaces of the incident side polarization plate 61. Further, in the light modulation devices 6AB, 6AR, the clamp-holding members 68 can be disposed on the side surfaces 610C, 610D (the side surfaces 610C, 610D along the extending direction of the wires WR) crossing the transmission axis TA of the polarization plate main body 611 out of the side surfaces of the incident side polarization plate 610. Therefore, even in the case in which the breakage described above occurs, it is possible to prevent the damaged part from being located in the transmission area of the light of the polarization plate main body 611, and thus, it is possible to further improve the reliability of the projector 1.

Further, the retardation elements 473 each constitute the incident side polarization plate 610, and each function as the light transmissive substrate for radiating the heat transferred from the polarization plate main body 611 in the incident side polarization plate 610. Therefore, there is no need to separately dispose the light transmissive substrate 612. Therefore, it is possible to prevent the number components from increasing by disposing the retardation elements 473.

Modifications of Embodiment

The invention is not limited to each of the embodiments described above, but includes modifications, improvements, and so on in the range in which the advantages of the invention can be achieved.

For example, it is possible to adopt the frame 65A shown in the second embodiment described above instead of the frame 65 shown in the first embodiment described above, and it is also possible to adopt the frame 65 instead of the frame 65A. In other words, it is possible for the frame to have a configuration provided only with the flow channel FP1, or a configuration provided with both of the flow channels FP1, FP2.

In each of the embodiments described above, it is assumed that the pair of clamp-holding members 68 are disposed in accordance with the side surfaces opposite to each other in the incident side polarization plate 61. However, this is not a limitation, and the number of the clamp-holding members 68 for clamp-holding the incident side polarization plate 61 and the support member 67 can arbitrarily be changed, and is only required to be no smaller than one. Further, it is also possible for the incident side attachment member 66 to have a configuration in which the support member 67 and the clamp-holding member 68 are integrated with each other.

Further, it is assumed that the clamp-holding members 68 are disposed in accordance with the side surfaces (the side surfaces along the extending direction of the wires WR) crossing the transmission axis TA of the polarization plate main body 611 out of the side surfaces of the incident side polarization plate 61, 610. However, this is not a limitation, and the arrangement positions of the clamp-holding members 68 can arbitrarily be changed. For example, depending on the configuration of the incident side polarization plate, it is also possible for the clamp-housing members to be disposed on the side surface which is not the side surface crossing the transmission axis TA.

Further, the side surfaces of the incident side polarization plate to which the clamp-holding members 68 are disposed are only required to cross the transmission axis of the incident side polarization plate (the polarization plate main body), but are not necessarily required to be perpendicular to the transmission axis thereof. Further, in the case in which, for example, the incident side polarization plate (the polarization plate main body) does not have a rectangular shape but has a circular shape, the clamp-holding region by the clamp-holding member can be located in a region crossing the transmission axis of the polarization plate main body in the peripheral edge of the polarization plate main body.

In each of the embodiments described above, it is assumed that the incident side polarization plate 61 has a configuration including the polarization plate main body 611 and the light transmissive substrate 612. However, this is not a limitation, but the light transmissive substrate 612 can be eliminated. Further, the incident side polarization plate 61 can also be what is obtained by disposing a polarization sheet on a light transmissive substrate.

Further, it is assumed that the polarization plate main body 611 is the wire-grid polarization element. However, this is not a limitation, but it is possible for the polarization plate main body 611 to be a polarization plate having a different configuration such as an organic polarization plate or an inorganic polarization plate. Further, it is also possible for the polarization plate main body 611 to be a polarization element which does not absorb but reflects the light of the polarization component along the axis perpendicular to the transmission axis even in the case of the wire-grid polarization element. In such a polarization plate main body 611, since the light intensity to be absorbed can be reduced, it is possible to prevent the rise in temperature of the polarization plate main body 611, and by extension, it is possible to suppress the deterioration.

In the first embodiment described above, it is assumed that the retardation elements 473 are disposed on the light emission side of the light modulation devices 6B, 6R on the light paths of the blue light LB and the red light LR, respectively. Further, in the second embodiment described above, it is assumed that the retardation elements 473 are disposed on the light incidence side of the light modulation devices 6AB, 6AR on the light paths of the blue light LB and the red light LR, respectively. However, these are not a limitation, but the retardation elements 473 can be eliminated. Further, even in the case in which the retardation elements 473 are disposed, the retardation elements 473 can be disposed on the upstream side on the light path of the color separation device 44. In other words, the arrangement positions of the retardation elements are not particularly limited providing the arrangement positions are on the light incidence side of the light combining device 474.

In each of the embodiments described above, it is assumed that the light modulation devices 6G, 6AG correspond to the first light modulation device, and the light modulation devices 6B, 6AB and the light modulation devices 6R, 6AR correspond to the second and third light modulation devices, respectively. However, the invention is not necessarily limited to the configuration described above depending on the wavelength of the light reflected by the light combining device 474 and the wavelength of the light transmitted by the light combining device 474 in addition to the arrangement of the light modulation devices 6, 6A, and the configuration of the light combining device 474.

Further, it is assumed that the green light LG corresponds to the first light beam, and the blue light LB and the red light LR correspond respectively Lo the second light beam and the third light beam. However, this is not a limitation, the first through third light beams can arbitrarily be changed in accordance with the configuration of the light combining device 474 and so on as described above. Further, the colored light beams modulated by the respective light modulation devices 6, 6A are not limited to the blue light LB, the green light LG, and the red light LR, but can also be other colored light beams.

In the second embodiment described above, it is assumed that the retardation elements 473 are adopted instead of the light transmissive substrate 612. Specifically, it is assumed that the light modulation devices 6AB, 6AG are each provided with the incident side polarization plate 610 having the polarization plate main body 611 and the retardation element 473 disposed on the light incidence side to the polarization plate main body 611 instead of the incident side polarization plate 61 having the polarization plate main body 611 and the light transmissive substrate 612. However, this is not a limitation, and it is also possible to adopt a configuration in which the retardation element 473 is disposed between the field lens 471 and the incident side polarization plate 61 (the incident side polarization plate 61 having the polarization plate main body 611 and the light transmissive substrate 612) of the light modulation device 6B, 6R in each of the light paths of the blue light LB and the red light LR.

In each of the embodiments described above, it is assumed that the image forming unit 472 including the light modulation devices 6, 6A is disposed inside the first sealed housing 511. However, this is not a limitation, and the image forming unit 472 is not necessarily required to be disposed inside the sealed housing.

In each of the embodiments described above, it is assumed that the cooling device 5 has the blast fan 513 (the second circulation device) for making the first refrigerant RE1 as the gaseous refrigerant flow between the incident side polarization plate 61 and the liquid crystal panel 63, and the blast fan 514 for making the first refrigerant RE1 flow between the liquid crystal panel 63 and the emission side polarization plate 62. However, this is not a limitation, and at least either of such blast fans 513, 514 can be eliminated. In other words, as long as the liquid refrigerant can be made to flow through the light modulation devices 6, 6A, the configuration of the cooling device 5 can arbitrarily be changed.

In each of the embodiments described above, it is assumed that the projector 1 is provided with the three light modulation devices 6 (6B, 6G and 6R) or the three light modulation devices 6A (6AB, 6AG and 6AR). However, this is not a limitation, and the invention can also be applied to a projector equipped with two or less, or four or more light modulation devices.

In each of the embodiments described above, it is assumed that there is adopted the configuration in which the image projection device 4 has the optical components shown in FIG. 2. However, this is not a limitation, and the optical components adopted in the image projection device 4 and the arrangement of the optical components can arbitrarily be changed.

In each of the embodiments described above, it is assumed that the light source device 41 has a configuration provided with the light source section 410 having the solid-state light sources SS, the light diffusion device 417 for diffusing a part of the light emitted from the light source section 410, and the wavelength conversion device 419 for conversing the wavelength of another part of the light. However, this is not a limitation, and is also possible for the light source device 41 to have a configuration provided with a light source lamp such as a super-high pressure mercury lamp, or a configuration having other solid-state light sources such as light emitting diodes (LED). In other words, the configuration of the light source device can arbitrarily be changed.

The entire disclosure of Japanese Patent Application No. 2017-209577, filed on Oct. 30, 2017 is expressly incorporated by reference herein.

What is claimed is:
1. A projector comprising:
a light source device that emits light;
an image forming device adapted to form an image using the light;
a projection optical device adapted to project the image formed by the image forming device; and
a cooling device adapted to cool the image forming device,
wherein the image forming device includes a light modulation device adapted to modulate the light,
the light modulation device includes
a liquid crystal panel,
an incident side polarization plate located on a light incidence side of the liquid crystal panel, and
an attachment member adapted to attach the incident side polarization plate to the liquid crystal panel,
the cooling device includes a first circulation device adapted to make a liquid refrigerant flow through the liquid crystal panel,
the liquid crystal panel includes
a panel main body having a modulation area having a rectangular shape and adapted to modulate the light, and
a frame surrounding the panel main body, and having a frame surface on a light incident side of the frame,
the frame includes a first flow channel through which the liquid refrigerant flows, the first flow channel being disposed outside the modulation area along one of a pair of long sides and a pair of short sides of the modulation area,
the incident side polarization plate includes
a polarization plate main body, and
a light transmissive substrate located on a light incidence side of the polarization plate main body, and having contact with the polarization plate main body,
the attachment member includes
a pair of clamp-holding members adapted to clamp-hold the incident side polarization plate, and
a support member attached to the frame surface and adapted to support the pair of clamp-holding members,
the pair of clamp-holding members are disposed at positions corresponding respectively to the pair of long sides, and the support member is connected to areas respectively along the pair of short sides outside the modulation area on the frame surface.

2. The projector according to claim 1, wherein
the frame includes a second flow channel through which a part of the liquid refrigerant flows, and
the second flow channel is disposed along the other of the pair of long sides outside the modulation area.

3. The projector according to claim 1, wherein
the polarization plate main body is a wire-grid polarization element having a transmission axis,
one of the pair of clamp-holding members is disposed corresponding to a side surface crossing the transmission axis, which is one of side surfaces of the incident side polarization plate, and
the other of the pair of clamp-holding members is disposed corresponding to a side surface crossing the transmission axis, which is another of side surfaces of the incident side polarization plate.

4. The projector according to claim 1, wherein
the image forming device includes
a plurality of the light modulation devices, and
a light combining device adapted to combine the light beams modulated by the plurality of light modulation devices with each other,
the light source device emits light including first light beam, second light beam, and third light beam,
the plurality of the light modulation devices includes
a first light modulation device adapted to modulate the first light beam,
a second light modulation device adapted to modulate the second light beam, and
a third light modulation device adapted to modulate the third light beam,
the light combining device transmits the first light beam modulated by the first light modulation device, and reflects the second light beam modulated by the second light modulation device and the third light beam modulated by the third light modulation device, to combine the first light beam, the second light beam, and the third light beam with each other,
the image forming device includes
a first retardation element disposed on light path of the second light beam entering the light combining device, and adapted to rotate a polarization direction of the second light beam entering the first retardation element, and
a second retardation element disposed on light path of the third light beam entering the light combining device, and adapted to rotate a polarization direction of the third light beam entering the second retardation element.

5. The projector according to claim 4, wherein
the first retardation element is disposed on a light emission side of the second light modulation device, on the light path of the second light beam,
the second retardation element is disposed on a light emission side of the third light modulation device on the light path of the third light beam,
the pair of clamp-holding members are disposed at positions corresponding respectively to the pair of long sides in each of the plurality of the light modulation devices, and
the support member is connected to areas respectively along the pair of short sides outside the modulation area on the frame surface in each of the plurality of the light modulation devices.

6. The projector according to claim 4, wherein
the first retardation element is disposed on a light incidence side of the polarization plate main body provided to the second light modulation device on the light path of the second light beam,
the second retardation element is disposed on a light incidence side of the polarization plate main body provided to the third light modulation device on the light path of the third light beam,
the pair of clamp-holding members provided to the first light modulation device are disposed at positions corresponding respectively to the pair of long sides in the first light modulation device,
the support member provided to the first light modulation device is connected to areas respectively along the pair of short sides outside the modulation area on the frame surface in the first light modulation device,
the pair of clamp-holding members provided to each of the second light modulation device and the third light modulation device are disposed at positions corresponding respectively to the pair of short sides in each of the second light modulation device and the third light modulation device, and
the support member provided to each of the second light modulation device and the third light modulation device is connected to areas respectively along the pair of long sides outside the modulation area on the frame surface in each of the second light modulation device and the third light modulation device.

7. The projector according to claim 1, wherein
the cooling device includes a second circulation device adapted to make a gaseous refrigerant flow through the incident side polarization plate and the liquid crystal panel along a direction from one of the pair of long sides toward the other of the pair of long sides.

* * * * *